US010852926B2

(12) United States Patent
Zheng et al.

(10) Patent No.: US 10,852,926 B2
(45) Date of Patent: Dec. 1, 2020

(54) FILTER OF DATA PRESENTATIONS VIA USER-GENERATED LINKS

(71) Applicant: salesforce.com, inc., San Francisco, CA (US)

(72) Inventors: Zuye Zheng, San Francisco, CA (US); Pragya Anand, San Francisco, CA (US); Sreevatson Mahabalipuram Chakravarthy, San Francisco, CA (US); Katherine Jeanne Rushton, San Francisco, CA (US); Danny Lai, San Francisco, CA (US); James Diefenderfer, San Francisco, CA (US); Khushboo Shah, San Francisco, CA (US); Vaibhav Garg, San Francisco, CA (US); Sandeep Rawat, San Francisco, CA (US)

(73) Assignee: SALESFORCE.COM., INC., San Francisco, CA (US)

( * ) Notice: Subject to any disclaimer, the term of this patent is extended or adjusted under 35 U.S.C. 154(b) by 63 days.

(21) Appl. No.: 15/603,146

(22) Filed: May 23, 2017

(65) Prior Publication Data

US 2018/0341392 A1 Nov. 29, 2018

(51) Int. Cl.
*G06F 16/248* (2019.01)
*G06F 16/25* (2019.01)
(Continued)

(52) U.S. Cl.
CPC ........ *G06F 3/04847* (2013.01); *G06F 16/248* (2019.01); *G06F 16/258* (2019.01);
(Continued)

(58) Field of Classification Search
CPC ............... G06F 16/2428; G06F 16/248; G06F 16/9535; G06F 16/2425; G06F 16/90335;
(Continued)

(56) References Cited

U.S. PATENT DOCUMENTS 4,674,043 A 6/1987 Hernandez et al.
5,577,188 A 11/1996 Zhu
(Continued)

OTHER PUBLICATIONS salesforce.com, Inc., Introducing the New Salesforce Analytics Cloud, Everything You Need to Know, Ebook, Feb. 19, 2015, pp. 1-12. Website: https://www.slideshare.net/MishaWilliams/ebook-introducing-wave-analytics-cloud.
(Continued)

*Primary Examiner* — Dangelino N Gortayo
(74) *Attorney, Agent, or Firm* — Schwabe Williamson & Wyatt

(57) ABSTRACT

A database system may include a data storage configured to store one or more data sets and a processor coupled to the data storage. The processor may receive a query for first data included in the one or more data sets and access the data storage to obtain the first data based on the query. The processor may transmit the first data to a user system. The processor may receive an indication of a filter request to filter the first data based on a characteristic. The processor may identify linked data within second data based on the characteristic, the linked data linked to a portion of the first data associated with the filter request. The processor may access the data storage to obtain the linked data and transmit the linked data to the user system, to enable updating of a data presentation to display the linked data.

19 Claims, 18 Drawing Sheets

(51) Int. Cl.
*G06F 16/903* (2019.01)
*G06F 16/9535* (2019.01)
*G06F 16/242* (2019.01)
*G06F 3/0484* (2013.01)

(52) U.S. Cl.
CPC ...... *G06F 16/2423* (2019.01); *G06F 16/2428* (2019.01); *G06F 16/90335* (2019.01); *G06F 16/9535* (2019.01); *G06T 2200/24* (2013.01)

(58) Field of Classification Search
CPC ... G06F 16/2423; G06F 16/258; G06F 16/283
USPC ............... 707/706, 769, 805, 754, 759, 809
See application file for complete search history.

(56) References Cited

U.S. PATENT DOCUMENTS

| | | | |
|---|---|---|---|
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,890 B2 | 4/2003 | Mundell et al. | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,651,241 B1 | 11/2003 | Hernandez, III | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya | |
| 7,069,497 B1 | 6/2006 | Desai | |
| 7,100,111 B2 | 8/2006 | McElfresh et al. | |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,401,131 B2 | 7/2008 | Robertson | |
| 7,403,975 B2 | 7/2008 | Berkery | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,624,338 B2 | 11/2009 | Opitz et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,190,619 B2 * | 5/2012 | Lehtipalo | G06F 16/248 707/754 |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,335,784 B2 * | 12/2012 | Gutt | G06F 3/04815 707/722 |
| 8,457,545 B2 | 6/2013 | Chan | |
| 8,468,545 B2 | 6/2013 | Townsend et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,548,973 B1 * | 10/2013 | Kritt | G06F 16/9535 707/706 |
| 8,566,301 B2 | 10/2013 | Rueben et al. | |
| 8,646,103 B2 | 2/2014 | Jakobson et al. | |
| 9,052,817 B2 | 6/2015 | Hotelling | |
| 9,092,572 B2 | 7/2015 | Shaphy | |
| 9,710,542 B2 * | 7/2017 | Hendricksen | G06F 16/319 |
| 9,817,891 B1 * | 11/2017 | Eksteen | G06F 16/2425 |

(56) References Cited

U.S. PATENT DOCUMENTS

| | | | |
|---|---|---|---|
| 10,114,896 B2 * | 10/2018 | Junginger | G06F 16/9535 |
| 10,360,136 B2 | 7/2019 | Zheng | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0143567 A1 | 7/2004 | Dettinger | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0144026 A1 | 6/2005 | Bennett et al. | |
| 2007/0150820 A1 | 6/2007 | Salvo | |
| 2007/0250472 A1 * | 10/2007 | Dettinger | G06F 16/2455 |
| 2007/0300151 A1 | 12/2007 | Araki | |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0233694 A1 | 9/2012 | Baliga | |
| 2012/0266244 A1 | 10/2012 | Green | |
| 2012/0290407 A1 | 11/2012 | Hubbard et al. | |
| 2013/0151572 A1 * | 6/2013 | Brocato | G06F 16/213 707/805 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0172821 A1 * | 6/2014 | Hu | G06F 16/9535 707/711 |
| 2014/0201194 A1 * | 7/2014 | Reddy | G06F 16/248 707/722 |
| 2014/0359537 A1 | 12/2014 | Jackobson et al. | |
| 2014/0372412 A1 * | 12/2014 | Humphrey | G06F 16/90335 707/722 |
| 2015/0356188 A1 * | 12/2015 | Konik | G06N 7/005 707/706 |
| 2016/0162172 A1 | 6/2016 | Rathod | |
| 2016/0188686 A1 | 6/2016 | Hopkins | |
| 2017/0344457 A1 | 11/2017 | Wagiaalla | |
| 2018/0341388 A1 | 11/2018 | Zheng | |
| 2018/0341572 A1 | 11/2018 | Zheng | |

OTHER PUBLICATIONS

Listing of Related Cases, Jun. 7, 2017.
Non-Final Office Action for U.S. Appl. No. 15/603,111 dated Jul. 3, 2018; 24 pages.

* cited by examiner

300

302

| Name | Billable | Location | Position | Year |
|---|---|---|---|---|
| John Doe | $530,000 | Portland | Partner | 2013 |
| Jane Doe | $490,000 | Portland | Partner | 2015 |
| Sam Doe | $455,000 | Portland | Associate | 2015 |
| Terry Doe | $430,000 | Portland | Associate | 2015 |
| Jerry Doe | $415,000 | Portland | Associate | 2015 |
| Tom Doe | $380,000 | Portland | Partner | 2008 |
| Sally Doe | $375,000 | Portland | Associate | 2006 |
| Kelly Doe | $375,000 | Portland | Partner | 2000 |
| Penny Doe | $300,000 | Portland | Partner | 1998 |
| Leonard Doe | $300,000 | Portland | Partner | 1981 |
| Sheldon Doe | $300,000 | Portland | Partner | 1979 |

304

| Name | Income | Office | Experience | Previous Firm | Position | Year Started |
|---|---|---|---|---|---|---|
| Steve Doe | $470,000 | Vancouver | 18 | Doe, Powell & Pollard | Partner | 2015 |

306

| Name | Billed | Office | Title |
|---|---|---|---|
| Katie Doe | 360,000 | Seattle | Part. |
| Carl Doe | 340,000 | Seattle | Assoc. |
| Ben Doe | 320,000 | Seattle | Assoc. |
| Lillian Doe | 320,000 | Seattle | Part. |

| Name | Billable | Location | Position |
|---|---|---|---|
| John Doe | $530,000 | Portland | Partner |
| Jane Doe | $490,000 | Portland | Partner |
| Sam Doe | $455,000 | Portland | Associate |
| Terry Doe | $430,000 | Portland | Associate |
| Jerry Doe | $415,000 | Portland | Associate |
| Tom Doe | $380,000 | Portland | Partner |
| Sally Doe | $375,000 | Portland | Associate |
| Kelly Doe | $375,000 | Portland | Partner |
| Penny Doe | $300,000 | Portland | Partner |
| Leonard Doe | $300,000 | Portland | Partner |
| Sheldon Doe | $300,000 | Portland | Partner |
| Steve Doe | $470,000 | Vancouver | Partner |
| Katie Doe | $360,000 | Seattle | Partner |
| Carl Doe | $340,000 | Seattle | Associate |
| Ben Doe | $320,000 | Seattle | Associate |
| Lillian Doe | $320,000 | Seattle | Partner |

*FIGURE 8*

FILTER OF DATA PRESENTATIONS VIA USER-GENERATED LINKS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to driving customer service interactions on social media.

BACKGROUND

Companies and individuals may post content on social media websites. For example, a company may post a page including video, images, links, text, etc. announcing a new product or service. Thousands of users may comment on the post. The company may hire an army of agents to create and use customer relationship management (CRM) cases to respond to and manage the user comments. The problem is that most of user comments are noise and do not need CRM cases opened or customer service support.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 shows example data sets that can be utilized by the runtime environment according to some implementations.

FIG. 8 shows an example data agnostic data set according to some implementations.

DETAILED DESCRIPTION

Figure 1A:
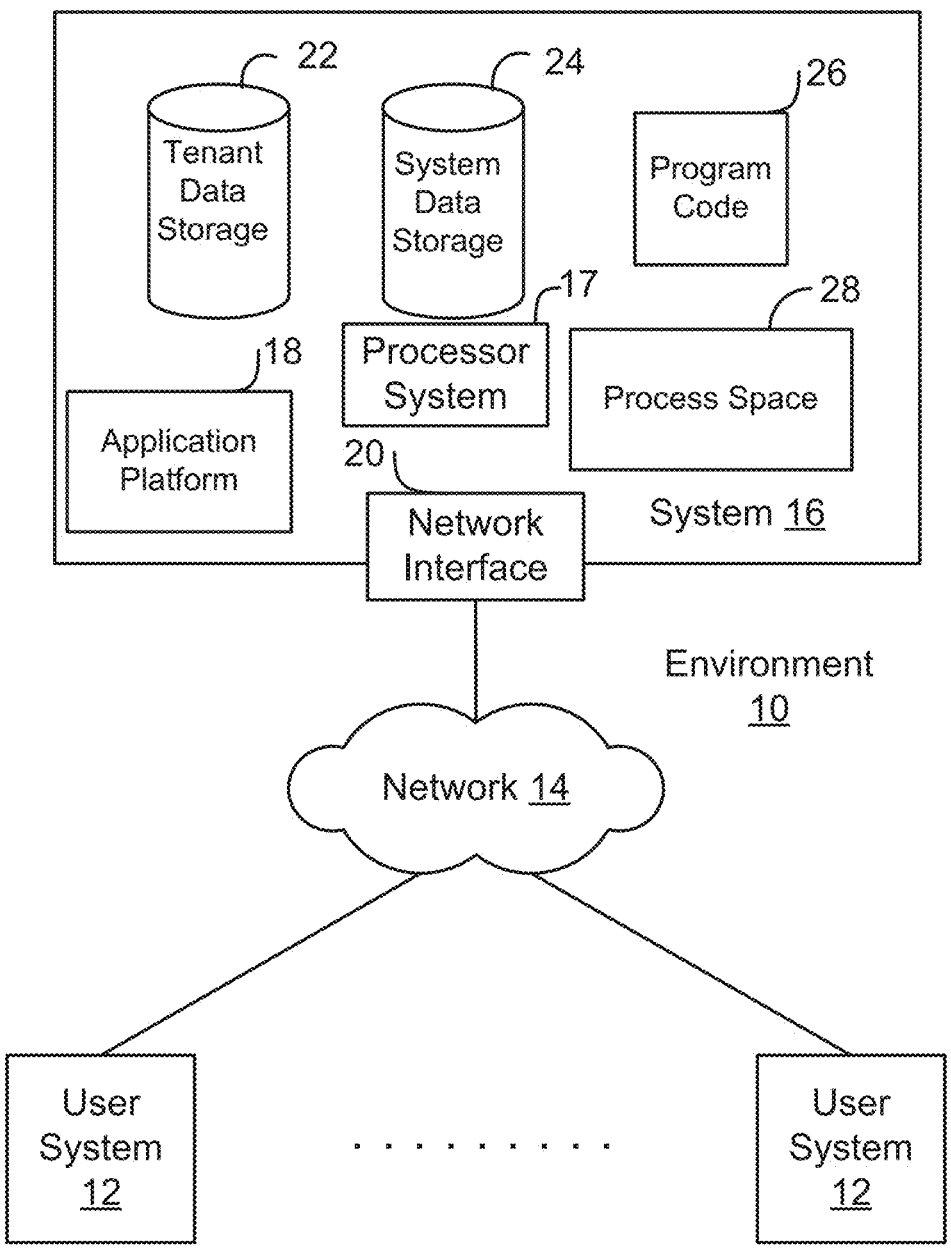
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
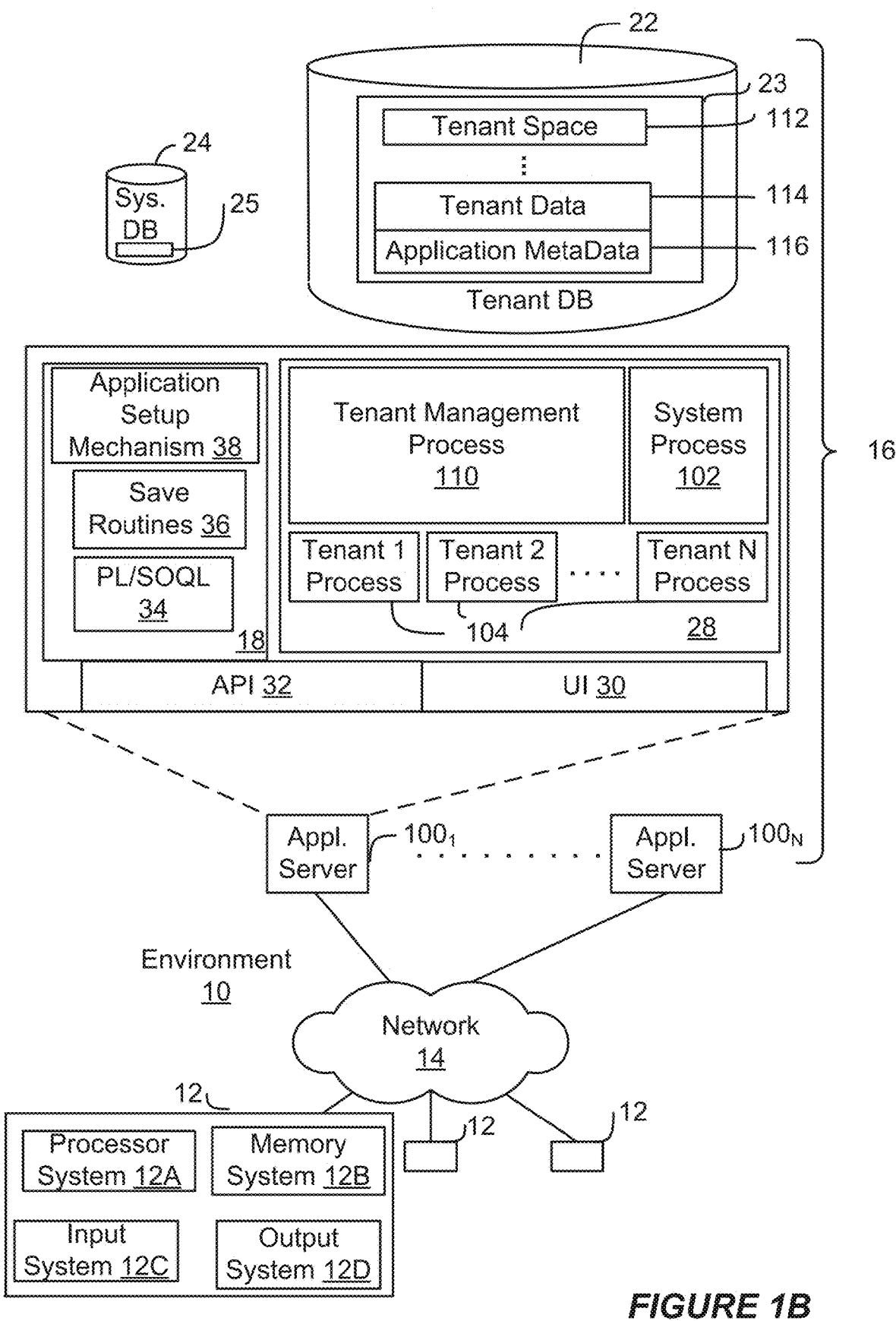
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
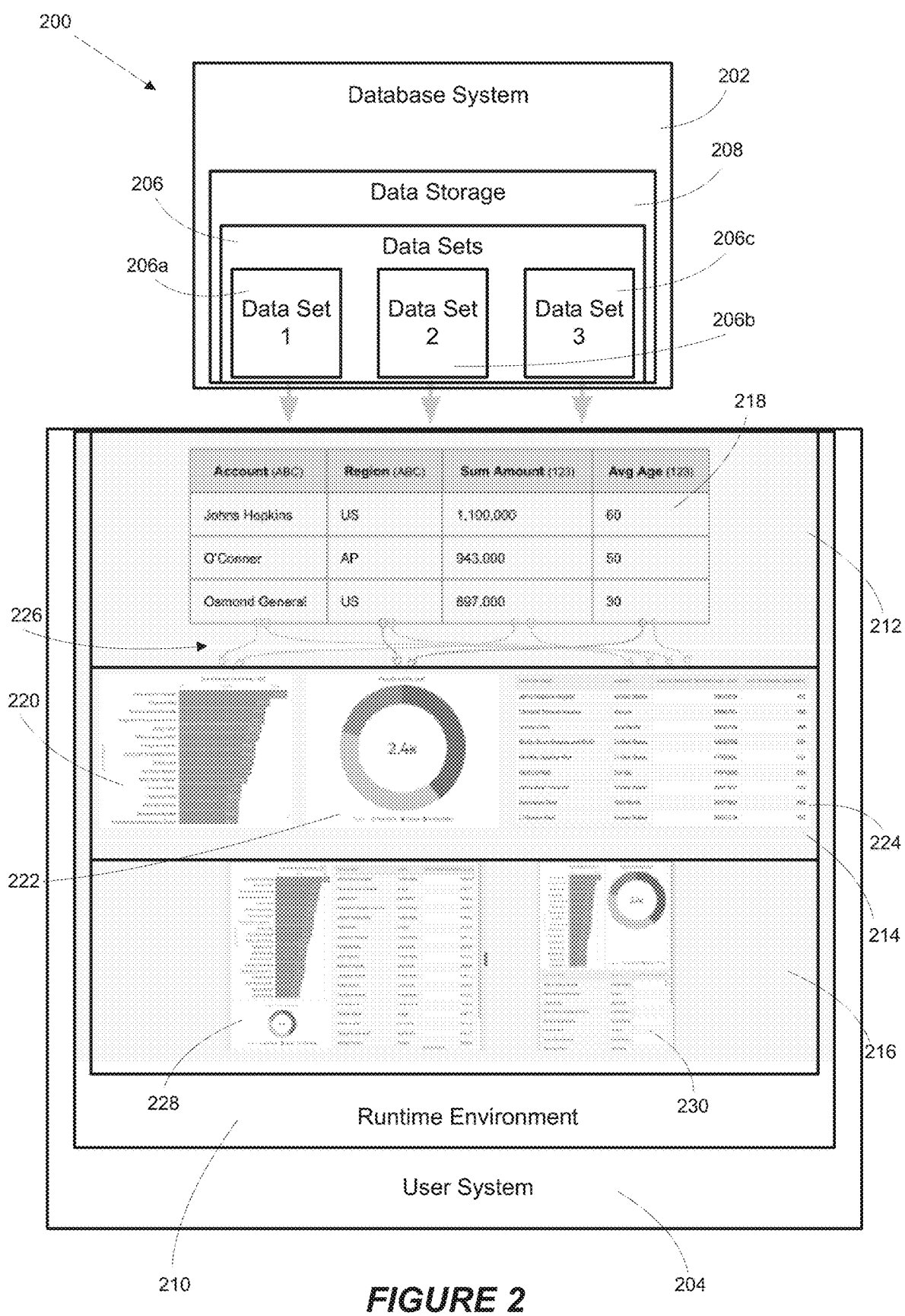
FIG. 2 shows an example environment in which a runtime environment can be implemented according to some implementations.

FIG. 2 shows an example environment 200 in which a runtime environment 210 can be implemented according to some implementations. The environment 200 may include a database system 202 and one or more user systems, such as user system 204, coupled to the database system 202. The one or more user systems (including the user system 204) may include one or more of the features of the user system 12 (FIG. 1A). The one or more user systems may be coupled to the database system 202 via a network (such as the network 14 (FIG. 1A)) and may communicate with the database system 202 via the network. The following description refers to user system 204 for clarity. However, it is to be understood that any of the one or more user systems may include one or more of the features of the user system 204.

The database system 202 may include one or more of the features of the database system 16 (FIG. 1A). The database system 202 may include one or more data sets 206. The data sets 206 may be stored within a data storage 208 of the database system 202. The data storage 208 may include a tenant data storage (such as the tenant data storage 22 (FIG. 1A)), a system data storage (such as the system data storage 24 (FIG. 1A)), or some combination thereof.

The data sets 206 may be accessible by the user system 204 and may include data provided to the database system 202 by the user system 204. The user system 204 may indicate which of the data sets 206 to which the data provided by the user system 204 should be added, may indicate that a new data set should be generated within the data sets 200 by the database system 202 for the data provided by the user system 204, may indicate a characteristic that may be used by the database system 202 to determine to which of the data sets 206 the data provided by the user system 204 should be stored, or some combination thereof. In some examples, each of the data sets 206 may be associated with a program, a file, a characteristic, or some combination thereof, wherein the data stored in each of the data sets 206 is associated with the program, the file, the characteristic, or combination thereof, corresponding to the data set in which the data is stored.

In some examples, one or more of the data sets 206 may be stored in a different format from the other data sets. For example, the first data set 206a may be in SAQL format, the second data set 206b may be in SOQL format, and the third data set may be in open data protocol format. In other examples, the first data set 206a, the second data set 206b, and the third data set 206c may be in any file format for storing data in databases. Further, in some examples, one or more of the data sets 206 may be stored in a format corresponding to a program that generated the data. For example, the first data set 206a may be in a format corresponding to a first program, the second data set 206b may be in a format corresponding to a second program, and the third data set 206c may be in a format corresponding to a third program. In some examples, one or more of the data sets 206 may be incompatible with the other data sets within the data sets 206 without conversion of the format of the one or more data sets 206.

The user system 204 may implement a runtime environment 210 that may display the data from the data sets 206 in multiple different formats. The runtime environment 210 may receive at least a portion of the data stored in the data sets 206 from the database system 202. The runtime environment 210 may receive the portion of the data in response to one or more queries generated by the runtime environment 210 and transmitted to the database system 202. In some examples, the database system 202 may push the portion of the data to the runtime environment 210 in response to determining that a rule stored on the database system 202 indicates that the portion of the data is to be displayed within the runtime environment 210. Further, in some examples, the database system 202 may push additional data to the runtime environment 210 in response to determining that the additional data is related to the portion of the data previously transmitted to the runtime environment 210 and was stored in the data sets 206 after the portion of the data was transmitted. The database system 202 may push the additional data to the runtime environment 210 in response to expiration of a predetermined interval of time after the portion of the data was previously transmitted to the runtime environment 210.

The runtime environment 210 may include multiple layers. Each of the layers may perform operations associated the data received from the database system 202 independent of the other layers. Further, each of the layers may output results of the operations performed by the layer to an adjacent layer and the adjacent layer perform operations of the adjacent layer on the results provided to the adjacent layer.

In the illustrated example, the runtime environment 210 may include a data format layer 212 (which may be referred to as a "steps layer"), a data presentation generation layer 214 (which may be referred to as a "widgets layer"), and a layout generation layer 216 (which may be referred to as a "layouts layer"). For example, the data format layer 212 may independently perform operations on the data received from the database system 202 and may output the results of the operations to the data presentation generation layer 214, which is adjacent to the data format layer 212. It is to be understood that, in some examples, the runtime environment 210 may include more, less, or different layers than the three layers illustrated.

Further, in some examples, one or more of the layers of the runtime environment 210 may be implemented by the database system 202, while the rest of the layers of the runtime environment 210 may be implemented by the user system 204. For example, the data format layer 212 may be implemented by the database system 202, while the data presentation generation layer 214 and the layout generation layer 216 may be implemented by the user system 204.

The data format layer 212 may receive data from the database system 202 and generate a data agnostic data set 218 with the received data. The received data from the database system 202 may include data from the data sets 206. The received data from the database system 202 may be in one or more different formats.

The data agnostic data set 218 may store the received data in a single format. In some examples, the single format may be a comma-separated value format, although, it is to be understood that the single format can be any format for storing data. In instances that the received data, or some portion thereof, is not in the single format when received, the generation of the data agnostic data set 218 by the data format layer 212 may include converting the received data, or portion thereof, into the single format for inclusion in the data agnostic data set 218. Further, in some examples, the generation of the data agnostic data set 218 by the data format layer 212 may include arranging the received data for inclusion in the data agnostic data set 218.

Further, the data format layer 212 may query the database system 202 for data and/or transmit one or more requests for data to the database system 202. The data format layer 212 may generate the queries and/or requests based on information received from the data presentation generation layer 214 that may indicate the data, and/or categories of data, to be included in the data agnostic data set 218. In some examples, the categories of data to be included in the data agnostic data set 218 may be predetermined and the data format layer 212 may generate the queries and/or requests based on the categories.

The data presentation generation layer 214 may utilize the data within the data agnostic data set 218 to generate one or more data presentations, such as the first data presentation 220, the second data presentation 222, and the third data presentation 224. The data presentations may include visual presentations of the data that may be displayed on a user interface of the user system 204. The visual presentations of the data may include, but are not limited, to graphs, charts, tables, heat maps, other maps that display the data, or some combination thereof.

The data presentation generation layer 214 may utilize different portions of the data from the data agnostic data set 218 to generate the different data presentations. Further, the portion of the data utilized by the data presentation generation layer 214 to generate a first one of the data presentations may overlap with the portion of the data utilized by the data presentation generation layer 214 to generate a second one of the data presentations, such that both the first one of the data presentations and the second one of the data presentations present some of the same data. For example, the data presentation generation layer 214 may use the account data of the data agnostic data set 218 to generate the first data presentation 220 and the third data presentation 224 in the illustrated example. Arrows 226 may represent the data of the data agnostic data set 218 utilized by the data presentation generation layer 214 for the generation of each of the data presentations in the illustrated example.

The layout generation layer 216 may utilize the data presentations generated by the data presentation generation layer 214 to generate one or more user interface layouts to be displayed on the user interface of the user system 204. In the illustrated example, the user interface layouts may include the first user interface layout 228 and the second user interface layout 230. It is to be understood that the layout generation layer 216 may generate a single user interface layout that corresponds to the user system 204, however, the layout generation layer 216 is described herein as generating multiple user interface layouts to illustrate the capabilities of the layout generation layer 216. Further, in some examples, the user system 204 may be coupled to other user systems and the layout generation layer 216 may generate user interface layouts to be provided for display on the other user systems.

The layout generation layer 216 may generate each of the user interface layouts based on a type of the user system 204 that is to display the user interface layout, dimensions of a user interface on which the user interface layout is to be displayed, predetermined layout templates, or some combination thereof. In the illustrated example, the first user interface layout 228 may be generated for display on a desktop and/or laptop computer and the second user interface layout 230 may be generated for display on a cell phone. Each of the user interface layouts may be optimized for display based on the type of device, the dimensions of the user interface, the predetermined layout templates, or some combination thereof, such that a user viewing the user interface of the user system 204 is able to interpret the data represented by the data presentations within the user interface layout.

Each of the user interface layouts generated by the layout generation layer 216 may include the data presentations generated by the data presentation generation layer 214. In the illustrated example, both the first user interface layout 228 and the second user interface layout 230 may display the first data presentation 220, the second data presentation 222, and the third data presentation 224. The layout generation layer 216 may arrange and/or size the data presentations to be displayed in the user interface layouts based on the type of the user system 204, the dimensions of the user interface, the predetermined layout templates, or some combination thereof. For example, the first user interface layout 228 has the second data presentation 222 arranged in the bottom left corner for the desktop and/or laptop computer, while the second user interface layout 230 has the second data presentation 222 arranged in the top right corner for the cell phone.

In some examples, the layout generation layer 216 may include only a portion of the data presentations generated by the data presentation generation layer 214 in one or more of the user interface layouts. For example, one of the user interface layouts generated by the layout generation layer 216 may include the first data presentation 220 and the second data presentation 222, while another of the user interface layouts generated by the layout generation layer 216 may include the first data presentation 220, the second data presentation 222, and the third data presentation 224. The layout generation layer 216 may select the data presentations to be included in each of the user interface layouts and/or omit certain data presentations from each of the user interface layouts based on the type of the user system 204, the dimensions of the user interface, the predetermined layout templates, or some combination thereof.

The user system 204 may display the user interface layout that corresponds to the user system 204 on a user interface of the user system 204. The user interface layout may correspond to the user system 204 based on the type of the user system 204, the dimensions of the user interface of the user system 204, a predetermined layout associated with the user system 204, or some combination thereof.

The user system 204 may further detect user interactions with the user interface layout displayed on the user interface. The user interactions may include a cursor click, a touch of the user interface, other detectable user interactions with user interfaces known by one having ordinary skill in the art, or some combination thereof. The user interactions may correspond to a filtering operation to be performed to one or more of the data presentations within the user interface layout displayed on the user interface of the user system 204.

The user system 204 may detect a location of the user interaction with the user interface layout, a portion of the user interface layout corresponding to the location of the user interaction, or some combination thereof. The location of the user interaction may be indicated by x- and y-coordinates of the user interaction on the user interface. The portion of the user interface layout may include an indication of the data presentation and an element of the data presentation corresponding to the location of the user interaction. For example, the user system 204 may detect the location of the user interaction corresponds to one of the bars (i.e. the element) within the first data presentation 220 in the first user interface layout 228 displayed on the user interface.

The layout generation layer 216 may receive an indication of the location, the portion of the user interface layout, or combination thereof, from the user system 204. The layout generation layer 216 may determine which data presentation and which part of the data presentation the filtering operation is associated with based on the indication. The layout generation layer 216 may generate an indication of the determined data presentation and the part of the data presentation associated with the filtering operation and provide the indication to the data presentation generation layer 214.

The data presentation generation layer 214 may receive the indication of the determined data presentation and the part of the data presentation associated with the filtering operation from the layout generation layer 216. The data presentation generation layer 214 may determine the data associated with the filtering operation and the filtering operation to be performed based on the indication. In some examples, the data presentation generation layer 214 may further determine which data is to be filtered from the data presentation, which data is to be presented in the data presentation based on the filtering operation, or some combination thereof.

The data presentation generation layer 214 may generate an indication of the data associated with the filtering operation to be performed, the data that is to be filtered from the data presentation, the data that is to be presented in the data presentation, or some combination thereof. The data presentation generation layer 214 may provide the indication to the data format layer 212 with a request that the data format layer 212 filter the data associated with the data presentation based on the indication.

In response to the data format layer 212 receiving the indication, the data format layer 212 may identify a portion of the data within the data agnostic data set 218 associated with the indication and a characteristic associated with the portion of the data. The characteristic may include one or more data entries within the data agnostic data set 218, one or more header entries within the data agnostic data set 218, or some combination thereof. The data format layer 212 may determine that the filtering operation includes filtering of the data presented by the data presentation based on the characteristic and that the data agnostic data set 218 is to be updated based on the filtering operation.

The data format layer 212 may generate a filter request to filter the data associated with the data agnostic data set 218 based on the characteristic. The data format layer 212 may transmit an indication of the filter request to the database system 202 to obtain data from the database system 202 associated with the filtering operation.

The database system 202 may receive the indication of the filter request and identify the characteristic associated with the filter request based on the indication. The database system 202 may identify a portion of the data from the data that was previously transmitted to the user system 204. The portion of the data may be associated with the filter request, including being associated with the characteristic. The database system 202 may identify the portion of the data within the data set from which the portion of data was previously obtained. For example, if the portion of the data was obtained from the first data set 206*a* when previously obtained, the database system 202 may identify the portion of the data within the first data set 206*a*, which may include identifying a location of the portion of the data within the first data set 206*a*. Further, if the portion of the data was obtained from the first data set 206*a* and the second data set 206*b*, the database system 202 may identify the portion of the data within the first data set 206*a* and the second data set 206*b*.

The database system 202 may identify one or more links associated with the portion of the data (as is described further throughout this disclosure). Identifying the links may include identifying metadata associated with the portion of the data. Each of the data entries within the portion of the data may include metadata. The metadata may indicate a link between the data entry and one or more data entries within the data set and/or other data sets within the data sets 206. In some examples, the metadata may further include an indication of one or more characteristics associated with the link, wherein the database system 202 may determine whether the link is associated with the filtering operation based on the characteristics associated with the link and the characteristic associated with the filter request.

The links may indicate another portion of data (hereinafter referred to as 'the linked data') within the data sets 206 that is linked with the identified portion of the data. In response to identifying the links, the database system 202 may be directed to the linked data by the links. The database system 202 may access the data storage 208 to obtain the linked data from the data sets 206. The database system 202 may transmit the linked data to the user system 204. In some examples, the database system 202 may further transmit the portion of the data associated with the filter request to the user system 204.

The data format layer 212 may receive the linked data and/or the data associated with the filter request from the database system 202 and may update the data agnostic data set 218 with the linked data and/or the data associated with the filter request. In response to the data agnostic data set 218 being updated, the data presentation generation layer 214 may update the data presentations based on the updated data agnostic data set 218. Updating the data presentations may include updating one or more of the data presentations, including the data presentation associated with the user interaction and/or the other data presentations. For example, the layout generation layer 216 may have identified that the first data presentation 220 was associated with the filtering operation and the data presentation generation layer 214 may update the first data presentation 220 and/or the second data presentation 222 based on the updated data agnostic data set 218. The other data presentations may be updated to display the linked data. The layout generation layer 216 may update the user interface layouts based on the updates to the data presentations.

FIG. 3 shows example data sets 300 that can be utilized by the runtime environment 210 (FIG. 2) according to some implementations. The data sets 300 may be representative of the data sets 206 (FIG. 2) and may be stored within the database system 202 (FIG. 2). The data sets 300 may be stored in a tenant data storage (such as the tenant data storage 22 (FIG. 1A)), a system data storage (such as the system data storage 24 (FIG. 1A), or some combination thereof.

The data sets 300 may include a first data set 302, a second data set 304, and a third data set 304. The data sets 300 may be stored in different formats and/or may store different data. For example, the first data set 302 may include data entries corresponding to name, billable, location, position, and year fields, and the second data set 304 may include entries corresponding to name, income, office, experience, previous firm, position, and year started fields.

Each of the data sets 300 may be associated with different tenants, customers, subscribers, organizations, entities, or some combination thereof. In the illustrated example, the first data set 302 may be associated with a Portland office location of a company, the second data set 304 may be associated with a Vancouver office location of the company, and the third data set 306 may be associated with a Seattle location of the company. The runtime environment 210 may be authorized to obtain the data from the data sets 300.

Figure 4:
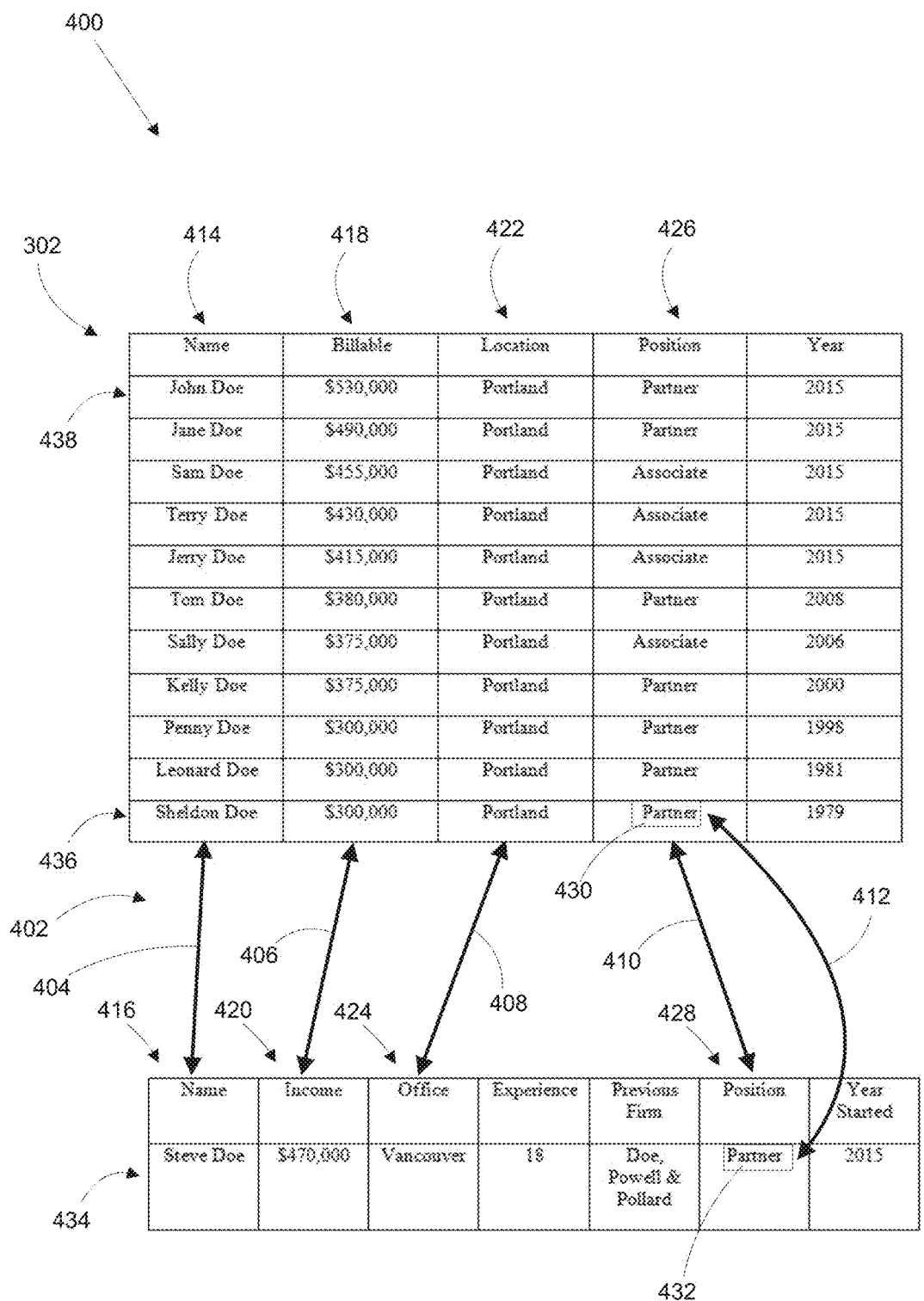
FIG. 4 shows visual representations of example links among data sets according to some implementations.

FIG. 4 shows visual representations 400 of example links 402 among data sets according to some implementations. In particular, the visual representations 400 provide representations of links 402 between data within the first data set 302 and the second data set 304. The links 402 may be stored by the database system 202 (FIG. 2) and may be associated with the data within the first data set 302 and/or the second data set 304 that are stored within the database system 202. For example, the links 402 may be stored as metadata associated with one or more data entries within the first data set 302 and/or the second data set 304.

The links 402 may link fields within the first data set 302 with fields within the second data set 304, data entries within the first data set 302 with data entries within the second data set 304, a particular data entry within the first data set 302 with one or more data entries within the second data set 304, one or more data entries within the first data set 302 with a particular data entry within the second data set 304, or some combination thereof.

In the illustrated example, the links 402 may include a first link 404, a second link 406, a third link 408, a fourth link 410, and a fifth link 412. The first link 404, the second link 406, the third link 408, and the fourth link 410 may be field links that link a field within the first data set 302 with a field within the second data set 304. The field links may link data entries within a field of the first data set 302 with data entries within a field of the second data set 304. In the illustrated example, the first link 404 may link a 'name' field 414 within the first data set 302 with a 'name' field 416 within the second data set 304. The second link 406 may link a 'billable' field 418 within the first data set 302 with an 'income' field 420 within the second data set 304. The third link 408 may link a 'location' field 422 within the first data set 302 with an 'office' field 424 within the second data set 304. The fourth link 410 may link a 'position' field 426 within the first data set 302 with a 'position' field 428 within the second data set 304.

The fifth link 412 may be a data entry value link. The data entry value link may associate a data entry value within the first data set 302 with a data entry value within the second data set 304. Further, the data entry value link may link data related to the data entry value within the first data set 302 with data related to the data entry value within the second data set 304 based on the association of the data entry value within the first data set 302 with the data entry value within the second data set 304. In the illustrated example, the fifth link 412 may associate a 'Partner' data entry value 430 within the first data set 302 with a 'Partner' data entry value 432 within the second data set 304. Accordingly, the fifth link 412 may link the data within the 'Steve Doe' row 434 with the data within the 'Sheldon Doe' row 436 based on the 'Steve Doe' row 434 being related to the 'Partner' data entry value 432 and the 'Sheldon Doe' row 436 being related to the 'Partner' data entry value 430. Further, the fifth link 412 may link the data within the 'Steve Doe' row 434 with data within the 'John Doe' row 438 based on the 'Steve Doe' row 434 being related to the 'Partner' data entry value 432 and the 'John Doe' row 438 being related to a data entry value of 'Partner.

The links 402 may be user-generated, generated by the database system 202, generated by the runtime environment 210, or some combination thereof. The database system 202 and/or the runtime environment 210 may identify data entries with equal values within the first data set 302 and the second data set 304 and determine whether the data entries should be linked based on metadata associated with the data entries and/or the location of the data entries with the data sets. The database system 202 and/or the runtime environment 210 may generate one or more links based on determination that the data entries have equal values and should be linked.

For example, the database system 202 and/or the runtime environment 210 may identify that the 'Name' data entry within the 'name' field 414 of the first data set 302 is equal to the 'Name' data entry within the 'name' field 416 of the second data set 302 in the illustrated example. Further, the database system 202 and/or the runtime environment 210 may determine that the 'Name' data entry within the 'name' field 414 is a field header of the first data set 302 based on metadata associated with the 'Name' data entry and/or location of the 'Name' data entry, and that the 'Name' data entry within the 'name' field 416 is a field header of the second data set 302 based on metadata associated with the 'Name' data entry and/or the location of the 'Name' data entry. The database system 202 and/or the runtime environment 210 may generate the first link 404 based on the identification of the equal data entry values and the link determination.

For the user-generated links, the runtime environment 210 may include a developer mode. In the developer mode, the runtime environment 210 may cause the first data set 302 and the second data set 304, or some portion thereof, to be displayed on the user interface of the user system 204. The user may interact with the runtime environment 210 to indicate links to be generated. The user may indicate links to be generated between data entries with equal entry values and/or data entries with different entry values. For example, the user may indicate that the second link 406 should have been generated between the 'billable' field 418 and the 'income' field 420. The runtime environment 210 may transmit indications of the links to be generated to the database system 202, wherein the database system 202 may generate the links in response to the indication.

Figure 5:
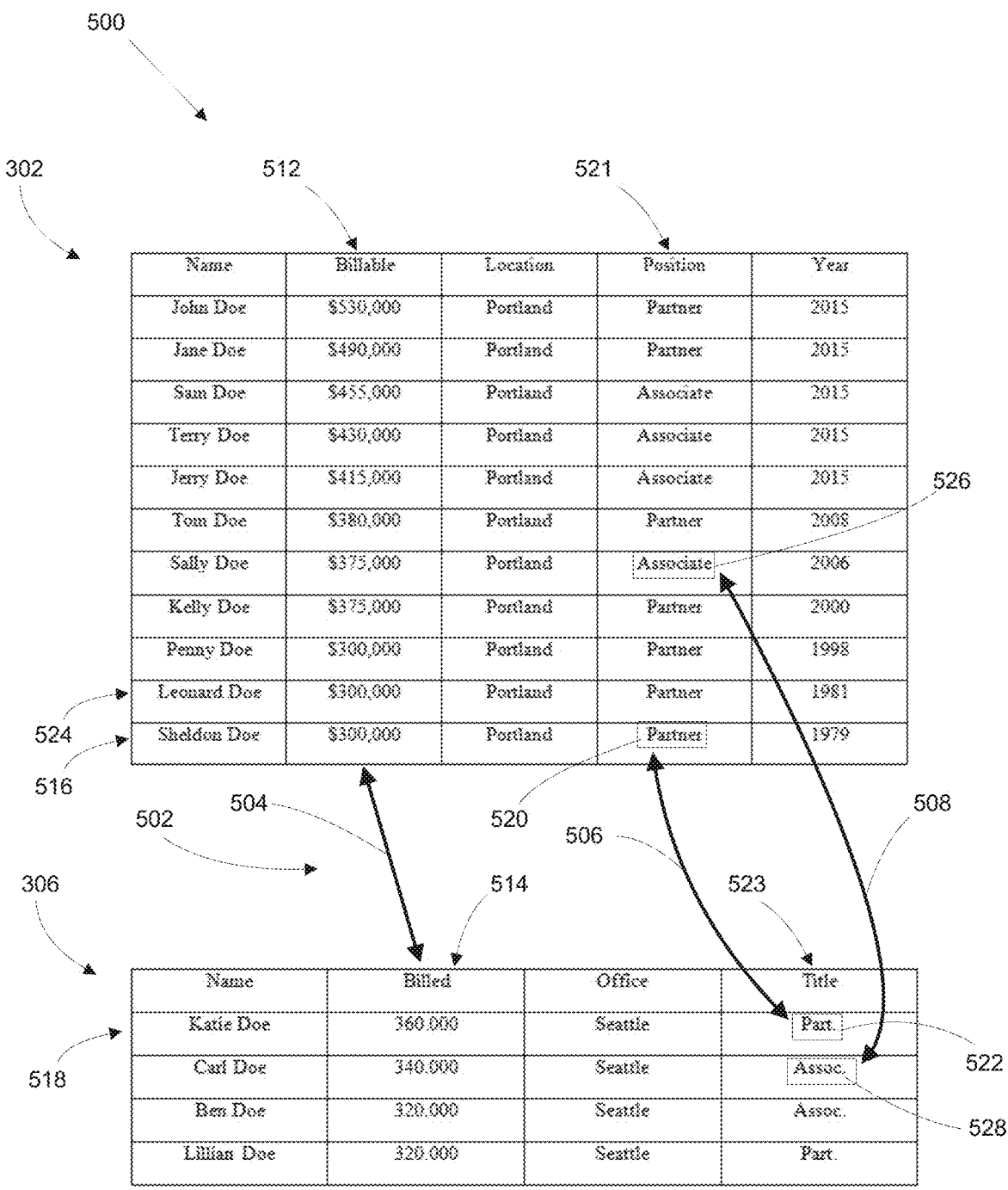
FIG. 5 shows visual representations of additional example links among data sets according to some implementations.

FIG. 5 shows visual representations 500 of additional example links 502 among data sets according to some implementations. The links 502 may include one or more of the features of the links 402 (FIG. 4). In particular, the visual representations 500 provide representations of links 502 between data within the first data set 302 and the third data set 306. The links 502 may be stored by the database system 202 (FIG. 2) and may be associated with the data within the first data set 302 and/or the third data set 306 that are stored within the database system 202. For example, the links 502 may be stored as metadata associated with data entries within the first data set 302 and/or the third data set 306.

The links 502 may link fields within the first data set 302 with fields within the third data set 306, data entries within the first data set 302 with data entries within the third data set 306, a particular data entry within the first data set 302 with one or more data entries within the third data set 306, one or more data entries within the first data set 302 with a particular data entry within the third data set 306, or some combination thereof. In some examples, the links 502 may link fields and/or data entries within one of the first data set 302 and/or the third data set 306 with other fields and/or data entries within the same data set.

In the illustrated example, the links 502 may include a first link 504, a second link 506, and a third link 508. The first link 504 may be a field link that links a field within the first data set 302 with a field within the third data set 306. In the illustrated example, the first link 504 may link a 'billable' field 512 within the first data set 302 with a 'billed' field 514 within the third data set 306.

The data entries within the 'billable' field 512 may be a different format from the data entries within the 'billed' field 514. In particular, the data entries within the 'billable' field 512 may have a format of '$XXX,XXX' and the data entries within the 'billed' field 514 may have a format of 'XXX.XXX'. The first link 504 may include an indication of a uniform format for the data entries, wherein the database system 202 may convert the data entries to the uniform format when transmitting the data entries to the user system 204 (FIG. 2) and/or the data format layer 212 (FIG. 2) may convert the data entries to the uniform format when received from the database system 202.

The second link 506 and the third link 508 may be data entry value links. The data entry value links may associate a data entry value within the first data set 302 with a data entry value within the third data set 306. Further, the data entry value links may link data related to the data related to the data entry value within the first data set 302 with data related to the data entry value within the third data set 306 based on the association of the data entry value within the first data set 302 with the data entry value within the third data set 306.

In the illustrated example, the second link 506 may associate the 'Partner' data entry value 520 of the 'position' field 521 within the first data set 302 with the 'Part.' data entry value 522 of the 'title' field 523 within the third data set 306. Accordingly, the second link 506 may link the data within the 'Sheldon Doe' row 516 with the data within the 'Katie Doe' row 518 based on the 'Sheldon Doe' row 516 being related to the 'Partner' data entry value 520 and the 'Katie Doe' row 518 being related to the 'Part.' data entry value 522. Further, the second link 506 may link the data within the 'Leonard Doe' row 524 with the data within the 'Katie Doe' row 518 based on the 'Leonard Doe' row 524 being related to a data entry value of 'Partner' and the 'Katie Doe' row 518 being related to the 'Part.' data entry value 522.

The 'Partner' data entry value 520 may have a different data entry value from the data entry value than of the 'Part.' data entry value 522. The second link 506 may include an indication of a uniform data entry value for the data entry values of the 'Partner' data entry value 520 and the 'Part.' data entry value 522, wherein the database system 202 may convert the data entry values to the uniform data entry value when transmitting the data entry values to the user system 204 (FIG. 2) and/or the data format layer 212 (FIG. 2) may convert the data entry values to the uniform data entry value when received from the database system 202.

The third link 508 may associate the 'Associate' data entry value 526 within the first data set 302 with the 'Assoc.' data entry value 528 within the third data set 306. Accordingly, the third link 508 may link the data related to the 'Associate' data entry value 526 with the data related to the 'Assoc.' data entry value 528. The third link 508 may include an indication of a uniform data entry value for the data entry values of the 'Associate' data entry value 526 and the 'Assoc.' data entry value 528. The database system 202 may convert the data entry values to the uniform data entry value when transmitting the data entry values to the user system 204 (FIG. 2) and/or the data format layer 212 (FIG. 2) may convert the data entry values to the uniform data entry value when received from the database system 202.

While the links 402 (FIG. 4) and the links 502 are examples of some types links that may be implemented by the environment 200 (FIG. 2), it is to be understood that other types of links may be implemented by the environment 200 between data within the data sets 206 (FIG. 2). Further, it is to be understood that the links may implemented by the environment 200 may include any links that may be implemented within metadata associated with data within the data sets 206 that may link a portion of data within the data sets 206 with another portion of data within the data sets 206.

Figure 6:
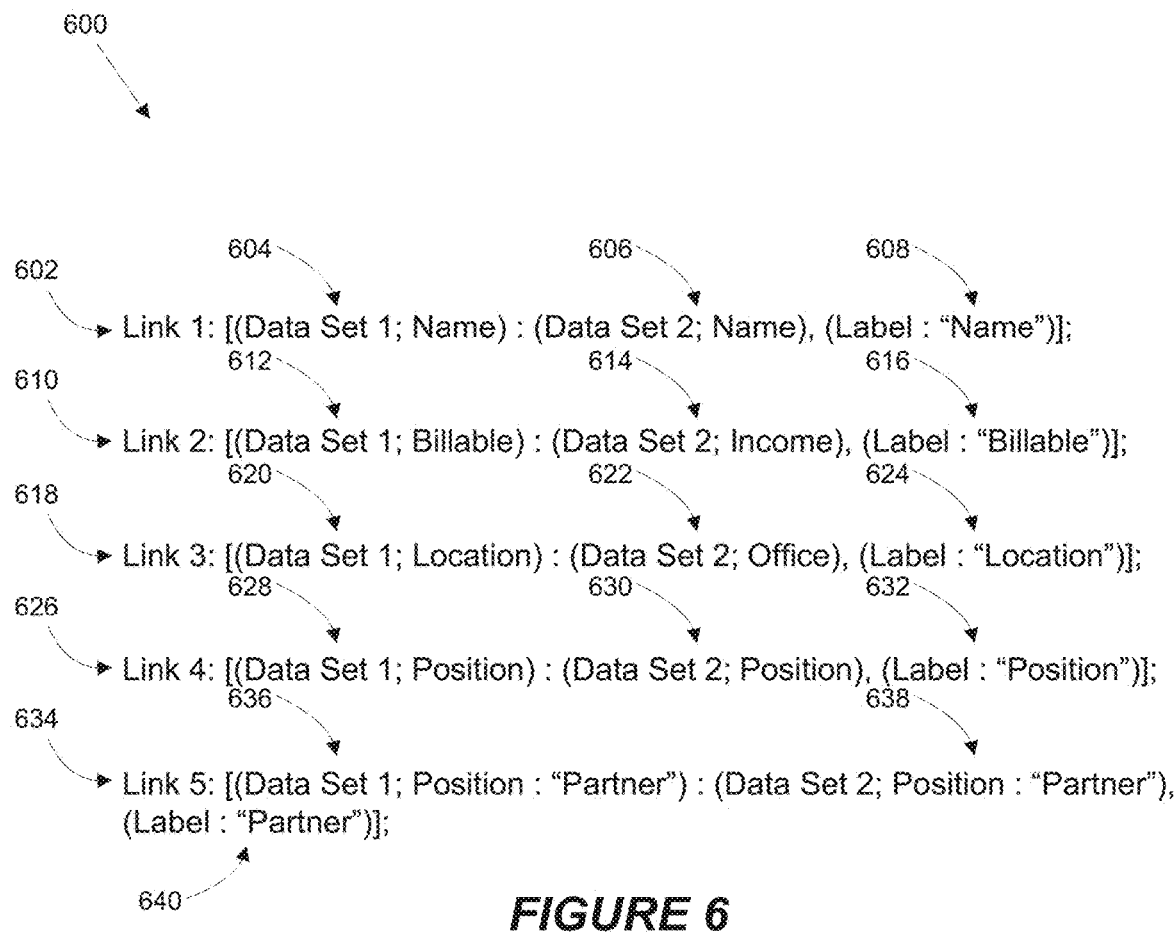
FIG. 6 shows textual representations of the example links among data sets of FIG. 4 according to some implementations.

FIG. 6 shows textual representations 600 of the example links 402 (FIG. 4) among data sets of FIG. 4 according to some implementations. The textual representations 600 may be representative of data included within metadata associated with the data to which the links 400 are directed. The metadata may be stored within a tenant data storage (such as the tenant data storage 22 (FIG. 1A)), a system data storage (such as the system data storage 22 (FIG. 1A)), or some combination thereof, and may be associated with the data to which the links 400 are directed.

A first textual representation 602 may be a textual representation of the first link 404 (FIG. 4). The first textual representation 602 may include an indication of first linked data 604, an indication of second linked data 606, a label 608, or some combination thereof. The indication of the first linked data 604 may indicate a first group of data (herein referred to as "the first linked data") that is to be linked to a second group of data. In the illustrated example, the indication of the first linked data 604 indicates that the first linked data is within the first data set 302 (FIG. 4) and associated with the 'name' field 414 (FIG. 4). The indication of the second linked data 606 may indicate the second group of data (herein referred to as "the second linked data") that is to be linked with the first linked data. In the illustrated example, the indication of the second linked data 606 indicates that the second linked data is within the second data set 304 (FIG. 4) and associated with the 'name' field 416 (FIG. 4). The database system 202 (FIG. 2) may identify the first link 404 (as described throughout this disclosure) and determine that the first linked data and the second linked data are to be linked based on the first link 404.

The label 608 may include a uniform entry for the field. The first link 404 may associate the uniform entry of the label 608 with the first linked data and the second linked data. The database system 202 may identify the first link 404 and determine that the first linked data and the second linked data are to be associated with the uniform entry of the label 608 based on the first link 404. When the database system 202 transmits the first linked data and/or the second linked data to the user system 204 (as described throughout this disclosure), the database system 202 may replace the entries in the field associated with the first linked data and/or the second linked data with the uniform entry of the label 608. In the illustrated example, the uniform entry within the label 608 is 'Name.' Accordingly, the database system 202 may indicate that the first linked data and the second linked data are associated with a field labeled 'Name' when transmitting the first linked data and/or the second linked data in the illustrated example.

A second textual representation 610 may be a textual representation of the second link 406 (FIG. 4). The second textual representation 610 may include one or more of the features of the first textual representation 602. In the illustrated example, the second textual representation 610 may include an indication of first linked data 612 that indicates that the first linked data of the second textual representation 610 is within the first data set 302 (FIG. 4) and associated with the 'billable' field 418 (FIG. 4), an indication of second linked data 614 that indicates that the second linked data of the second textual representation 610 is within the second data set 304 (FIG. 4) and associated with the 'income' field 420 (FIG. 4), and a label 616 with a uniform entry of 'Billable.' The database system 202 may indicate that the first linked data and the second linked data are associated with a field labeled 'Billable' when transmitting the first linked data and/or the second linked data in the illustrated example. It should be noted that although the second linked data is associated with a field labeled 'Income' in the second data set 304, the database system 202 may indicate that the second linked data is associated with a field labeled 'Billable' when transmitting the second linked data in the illustrated example based on the second link 406.

A third textual representation 618 may be a textual representation of the third link 408 (FIG. 4). The third textual representation 618 may include one or more of the features of the first textual representation 602. In the illustrated example, the third textual representation 618 may include an indication of first linked data 620 that indicates that the first linked data of the third textual representation 618 is within the first data set 302 (FIG. 4) and associated with the 'location' field 422 (FIG. 4), an indication of second linked data 622 that indicates that the second linked data of the third textual representation 618 is within the second data set 304 (FIG. 4) and associated with the 'office' field 424 (FIG. 4), and a label 624 with a uniform entry of 'Location.' The database system 202 may indicate that the first linked data and the second linked data are associated with a field labeled 'Location' when transmitting the first linked data and/or the second linked data in the illustrated example. It should be noted that although the second linked data is associated with a field labeled 'Office' in the second data set 304, the database system 202 may indicate that the second linked data is associated with a field labeled 'Location' when transmitting the second linked data in the illustrated example based on the third link 408.

A fourth textual representation 626 may be a textual representation of the fourth link 410 (FIG. 4). The fourth textual representation 626 may include one or more of the features of the first textual representation 602. In the illustrated example, the fourth textual representation 626 may include an indication of first linked data 628 that indicates that the first linked data of the fourth textual representation 626 is within the first data set 302 (FIG. 4) and associated with the 'position' field 426 (FIG. 4), an indication of second linked data 630 that indicates that the second linked data of the fourth textual representation 626 is within the second data set 304 (FIG. 4) and associated with the 'position' field 428 (FIG. 4), and a label 632 with a uniform entry of 'Position.' The database system 202 may indicate that the first linked data and the second linked data are associated with a field labeled 'Position' when transmitting the first linked data and/or the second linked data in the illustrated example.

A fifth textual representation 634 may be a textual representation of the fifth link 412 (FIG. 4). The fifth textual representation 634 may include an indication of first linked data 636, an indication of second linked data 638, a label 640, or some combination thereof. The indication of the first linked data 638 may indicate a first group of data (herein referred to as "the first linked data") that is to be linked to a second group of data. In the illustrated example, the indication of the first linked data 638 indicates that the first linked data is within the 'position' field 426 (FIG. 4) of the first data set 302 (FIG. 4) and associated with the 'Partner' data entry value 430. The indication of the second linked data 638 may indicate the second group of data (herein referred to as "the second linked data") that is to be linked with the first linked data. In the illustrated example, the indication of the second linked data 638 indicates that the second linked data is within the 'position' field 428 of the second data set 304 (FIG. 4) and associated with the 'Partner' data entry value 432 (FIG. 4). The database system 202 (FIG. 2) may identify the fifth link 412 (as described throughout this disclosure) and determine that the first linked data and the second linked data are to be linked based on the fifth link 412.

The label 640 may include a uniform entry value for the 'Partner' data entry value 430 and the 'Partner' data entry value 432. The fifth link 412 may associate the uniform entry value of the label 632 with the first linked data and the second linked data. The database system 202 may identify the fifth link 412 and determine that the first linked data and the second linked data are to be associated with the uniform entry value based on the fifth link 412. When the database system 202 transmits the first linked data and/or the second linked data to the user system 204 (as described throughout this disclosure), the database system 202 may replace the data entry values associated with the first linked data and/or the second linked data with the uniform entry value of the label 632. In the illustrated example, the uniform entry value within the label 632 is 'Partner.' Accordingly, the database system 202 may indicate that the first linked data and the second linked data are associated with a data entry value of 'Partner' when transmitting the first linked data and/or the second linked data in the illustrated example.

While the textual representations 600 are representations of some of the information that may be included in links described throughout this disclosure, it is to be understood that the links may include more, less, and/or different information in other examples. The information included in the links may include any information sufficient to indicate an association between at least two groups of data.

Figure 7:
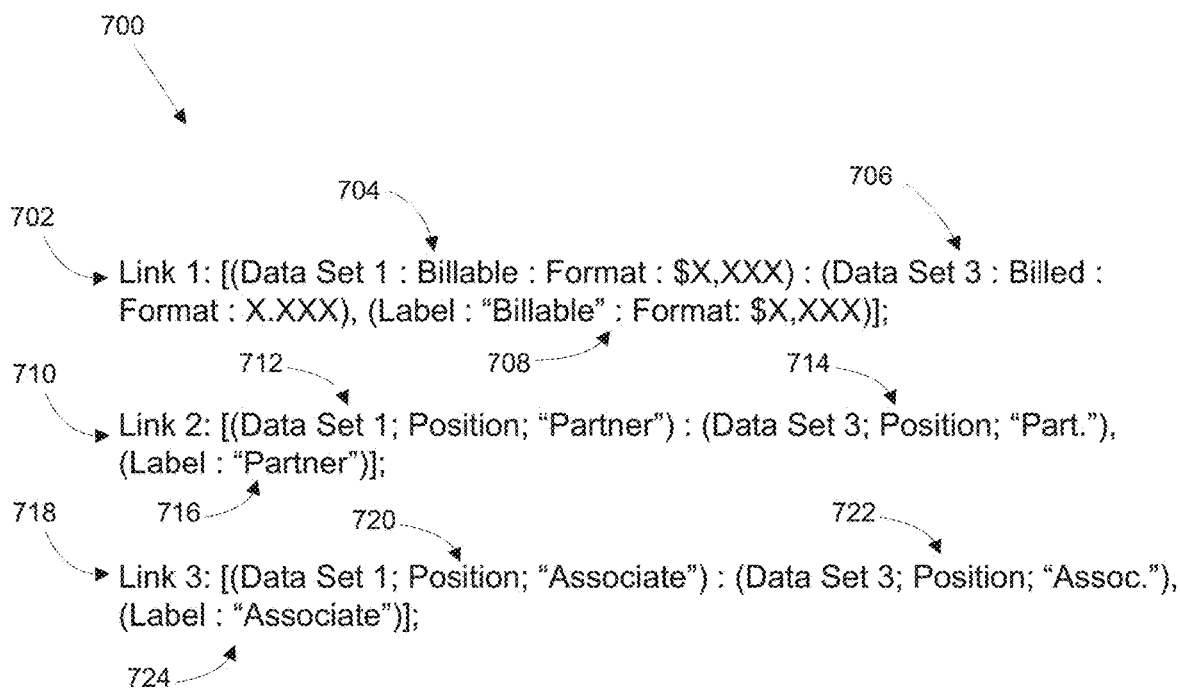
FIG. 7 shows textual representations of the additional example links among data sets of FIG. 5 according to some implementations.

FIG. 7 shows textual representations 700 of the additional example links 500 among data sets of FIG. 5 according to some implementations. The textual representations 700 may be representative of data included within metadata associated with the data to which the links 500 are directed. The metadata may be stored within a tenant data storage (such as the tenant data storage 22 (FIG. 1A)), a system data storage (such as the system data storage 22 (FIG. 1A)), or some combination thereof, and may be associated with the data to which the links 500 are directed.

A first textual representation 702 may be a textual representation of the first link 504 (FIG. 5). The first textual representation 702 may include one or more of the features of the first textual representation 602 (FIG. 6). The first textual representation 702 may include an indication of first linked data 704, an indication of second linked data 706, a label 708, or some combination thereof. The indication of the first linked data 704 may indicate a first group of data (herein referred to as "the first linked data") that is to be linked to a second group of data. Further, the indication of the first linked data 704 may include an indication of a format of the first linked data. In the illustrated example, the indication of the first linked data 704 indicates that the first linked data is within the first data set 302 (FIG. 5), associated with the 'billable' field 512 (FIG. 5), and indicates that the format of the first linked data is '$X,XXX', where the '$' indicates that the first linked data is led by a dollar symbol character, the 'X' indicates a character within the first linked data, and the ',' indicates that a comma separator is included in the first linked data for each three characters starting at the least significant character position of the first linked data.

The indication of the second linked data 706 may indicate the second group of data (herein referred to as "the second linked data") that is to be linked with the first linked data. Further, the indication of the second linked data 706 may include an indication of a format of the second linked data. In the illustrated example, the indication of the second linked data 706 indicates that the second linked data is within the third data set 306 (FIG. 5), associated with the 'billed' field 516 (FIG. 5), and indicates that the format of the second linked data is 'X.XXX', where the 'X' indicates a character within the second linked data, and the '.' indicates that a period separator is included in the second linked data for each three characters starting at the least significant character position of the first linked data. The database system 202 (FIG. 2) may identify the first link 504 (as described throughout this disclosure) and determine that the first linked data and the second linked data are to be linked based on the first link 504.

The label 708 may include a uniform entry for the field and a uniform format for the data entries within the first linked data and the second linked data. The first link 504 may associate the uniform entry and the uniform format of the label 708 with the first linked data and the second linked data. The database system 202 may identify the first link 504 and determine that the first linked data and the second linked data are to be associated with the uniform entry and the uniform format of the label 708 based on the first link 504.

When the database system 202 transmits the first linked data and/or the second linked data to the user system 204 (as described throughout this disclosure), the database system 202 may replace the entries in the field associated with the first linked data and/or the second linked data with the uniform entry of the label 708. In the illustrated example, the uniform entry within the label 708 is 'Name'. Accordingly, the database system 202 may indicate that the first linked data and the second linked data are associated with a field labeled 'Name' when transmitting the first linked data and/or the second linked data in the illustrated example. Further, the database system 202 may format the data entries of the first linked data and the second linked data in accordance with the uniform format. In the illustrated example, the uniform format may be '$X,XXX'. Accordingly, the database system 202 may format the first linked data and the second linked data to be in the '$X,XXX' format. It should be noted that although the second linked data is stored in 'X.XXX' format in the second data set 304, the database system 202 may convert the second linked data to '$X,XXX' format when transmitting the second linked data in the illustrated example based on the first link 504.

A second textual representation 710 may be a textual representation of the second link 506 (FIG. 5). The second textual representation 710 may include one or more of the features of the first textual representation 702. In the illustrated example, the second textual representation 710 may include an indication of first linked data 712 that indicates that the first linked data of the second textual representation 710 is within the first data set 302 (FIG. 5), associated with the 'position' field 521 (FIG. 5), and associated with the 'Partner' data entry value 520, and an indication of second linked data 714 that indicates that the second linked data of the second textual representation 710 is within the third data set 306 (FIG. 5), associated with the 'title' field 523 (FIG. 5), and associated with the 'Part.' data entry value 522.

A label 716 of the second textual representation 710 may include a uniform entry for the field and a uniform data entry value for the data entries within the first linked data and the second linked data. The second link 506 may associate the uniform entry and the uniform data entry value of the label 716 with the first linked data and the second linked data. The database system 202 may identify the second link 506 and determine that the first linked data and the second linked data are to be associated with the uniform entry and the uniform data entry value of the label 716 based on the second link 506.

When the database system 202 transmits the first linked data and/or the second linked data to the user system 204 (as described throughout this disclosure), the database system 202 may replace the entries in the field associated with the first linked data and/or the second linked data with the uniform entry for the field of the label 716. In the illustrated example, the uniform entry within the label 716 is 'Position'. Accordingly, the database system 202 may indicate that the first linked data and the second linked data are associated with a field labeled 'Position' when transmitting the first linked data and/or the second linked data in the illustrated example. Further, the database system 202 may replace the data entry values for the field of the first linked data and the second linked data with the uniform data entry value of the label 716. In the illustrated example, the uniform data entry value may be 'Partner'. Accordingly, the database system 202 may replace the data entry values for the field of the first linked data and the second linked data with the data entry value of 'Partner'. It should be noted that although the second linked data is stored associated with the 'Title' field and with data entry values of 'Part.' in the third data set 306, the database system 202 may indicate that the second linked data is associated with the 'Position' field and replace the data entry values of the 'Position' field with the data entry values of 'Partner' when transmitted in the illustrated example based on the second link 506.

A third textual representation 718 may be a textual representation of the third link 508 (FIG. 5). The third textual representation 718 may include one or more of the features of the first textual representation 702. In the illustrated example, the third textual representation 718 may include an indication of first linked data 720 that indicates that the first linked data of the third textual representation 718 is within the first data set 302 (FIG. 5), associated with the 'position' field 521 (FIG. 5), and associated with the 'Associate' data entry value 526, and an indication of second linked data 722 that indicates that the second linked data of the third textual representation 718 is within the third data set 306 (FIG. 5), associated with the 'title' field 523 (FIG. 5), and associated with the 'Assoc.' data entry value 528.

A label 724 of the third textual representation 718 may include a uniform entry for the field and a uniform data entry value for the data entries within the first linked data and the second linked data. The third link 508 may associate the uniform entry and the uniform data entry value of the label 724 with the first linked data and the second linked data. The database system 202 may identify the third link 508 and determine that the first linked data and the second linked data are to be associated with the uniform entry and the uniform data entry value of the label 724 based on the third link 508.

When the database system 202 transmits the first linked data and/or the second linked data to the user system 204 (as described throughout this disclosure), the database system 202 may replace the entries in the field associated with the first linked data and/or the second linked data with the uniform entry for the field of the label 724. In the illustrated example, the uniform entry within the label 724 is 'Position'. Accordingly, the database system 202 may indicate that the first linked data and the second linked data are associated with a field labeled 'Position' when transmitting the first linked data and/or the second linked data in the illustrated example. Further, the database system 202 may replace the data entry values for the field of the first linked data and the second linked data with the uniform data entry value of the label 724. In the illustrated example, the uniform data entry value may be 'Associate'. Accordingly, the database system 202 may replace the data entry values for the field of the first linked data and the second linked data with the data entry value of 'Associate'. It should be noted that although the second linked data is stored associated with the 'Title' field and with data entry values of 'Assoc.' in the third data set 306, the database system 202 may indicate that the second linked data is associated with the 'Position' field and replace the data entry values of 'Assoc.' of the 'Position' field with the data entry values of 'Associate' when transmitted in the illustrated example based on the first link 504.

While the textual representations 700 are representations of some of the information that may be included in links described throughout this disclosure, it is to be understood that the links may include more, less, and/or different information in other examples. The information included in the links may include any information sufficient to indicate an association between at least two groups of data.

FIG. 8 shows an example data agnostic data set 800 according to some implementations. The data agnostic data set 800 may be generated by the data format layer 212 (FIG. 2) of the runtime environment 210 (FIG. 2) in response to the runtime environment 210 receiving data from data sets stored on the data storage 208 (FIG. 2) of the database system 202 (FIG. 2). In the illustrated example, the runtime environment 210 may have received data included in the first data set 302 (FIG. 3), the second data set 304 (FIG. 3), and the third data set 306 and generated the data agnostic data set 800 based on the received data. The data received may have been converted into a common format by the database system 202 prior to transmission. In some examples, the data may be received by the runtime environment 210 in multiple different formats and be converted into a common format by the data format layer 212.

Figure 9:
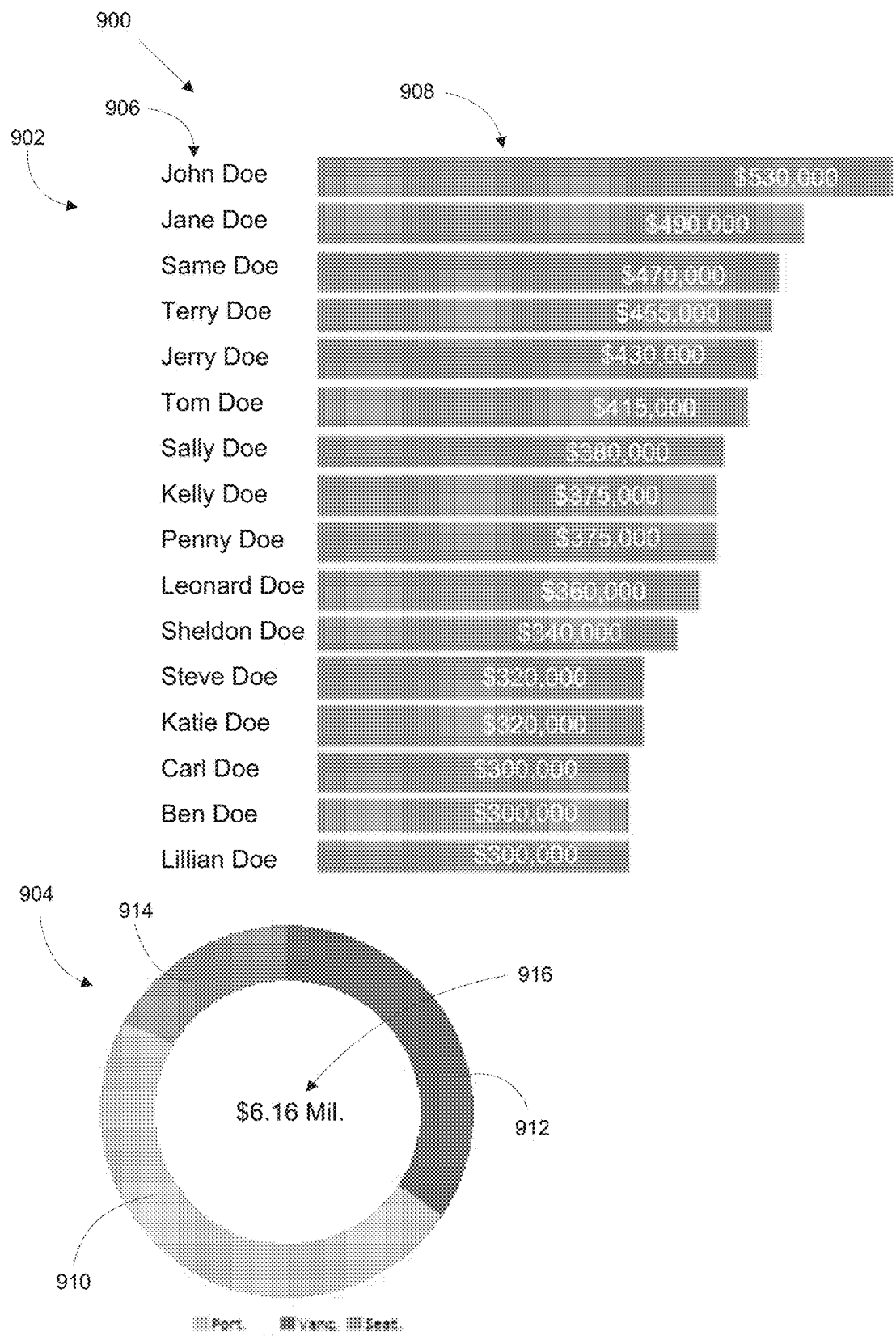
FIG. 9 shows example user interface layout based on the data agnostic data set of FIG. 8 according to some implementations.

FIG. 9 shows example user interface layout 900 based on the data agnostic data set 800 of FIG. 8 according to some implementations. The user interface layout 900 may include a first data presentation 902 and a second data presentation 904. The data presentation generation layer 214 (FIG. 2) may have generated the first data presentation 902 and the second data presentation 904 based on the data included in the data agnostic data set 800.

The first data presentation 902 may include a bar graph representation of data within the data agnostic data set 800). In the illustrated example, the first data presentation 902 may be a bar graph illustrating the relationship between the data entry values from the 'name' field and data entry values from the 'billable' field of the data agnostic data set 800. The first data presentation 902 may list the names 906 of the data entry values from the 'name' field and illustrate the billables 908 of the data entry values from the 'billable' field as bars of the bar graph next to the corresponding name.

The second data presentation 904 may include a version of a pie chart that illustrates data within the data agnostic data set 800. The data illustrated in the second data presentation 904 may be the same as or different from the data illustrated in the first data presentation 902. In the illustrated example, the second data presentation 904 may be a version of a pie chart illustrating the relationship between the entries from the location field and the entries from the billable field of the data agnostic data set 800. The second data presentation 904 may have portions of the pie chart corresponding to the entries from the location field and may size the portions of the pie chart based on the entries from the billable field corresponding to each of the entries of the location field. In the illustrated example, the data presentation generation layer 214 may identify that the data included in the data agnostic data set 800 is associated with three locations ('Portland', 'Vancouver', and 'Seattle') based on the entries of the location field and associate a first portion 910 with 'Portland', a second portion 912 with Seattle, and a third portion 914 with 'Vancouver'. The data presentation generation layer 214 may identify the entries from the 'billable' field associated with each of the three locations. Further, the data presentation generation layer 214 may size the first portion 910 based on an aggregate value of the data entries from the 'billable' field associated with 'Portland', may size the second portion 912 based on an aggregate value of the data entries from the 'billable' field associated with 'Seattle', and may size the third portion 914 based on an aggregate value of the data entries from the 'billable' field associated with 'Vancouver'. The second data presentation 904 may further include an aggregate value 916 of all the data entry values from the 'billable' field displayed in a center of the version of the pie chart.

The layout generation layer 216 (FIG. 2) may receive the first data presentation 902 and the second data presentation 904 from the data presentation generation layer 214 and generate the user interface layout 900. In the illustrated example, the layout generation layer 216 may position the second data presentation 904 below the first data presentation 902. The layout generation layer 216 may cause the user interface layout 900 to be displayed on a user interface of the user system 204 (FIG. 2).

The layout generation layer 216 may detect one or more user interactions with the user interface layout 900 when displayed on the user interface of the user system 204. The detection of the user interactions may be performed as the detection of the user interactions is described in relation to FIG. 2. The runtime environment 210 (FIG. 2) may further filter the data agnostic data 800 set based on the user interaction. The runtime environment 210 may perform the operations described in relation to the filtering operation of FIG. 2 to filter the data.

Figure 10:
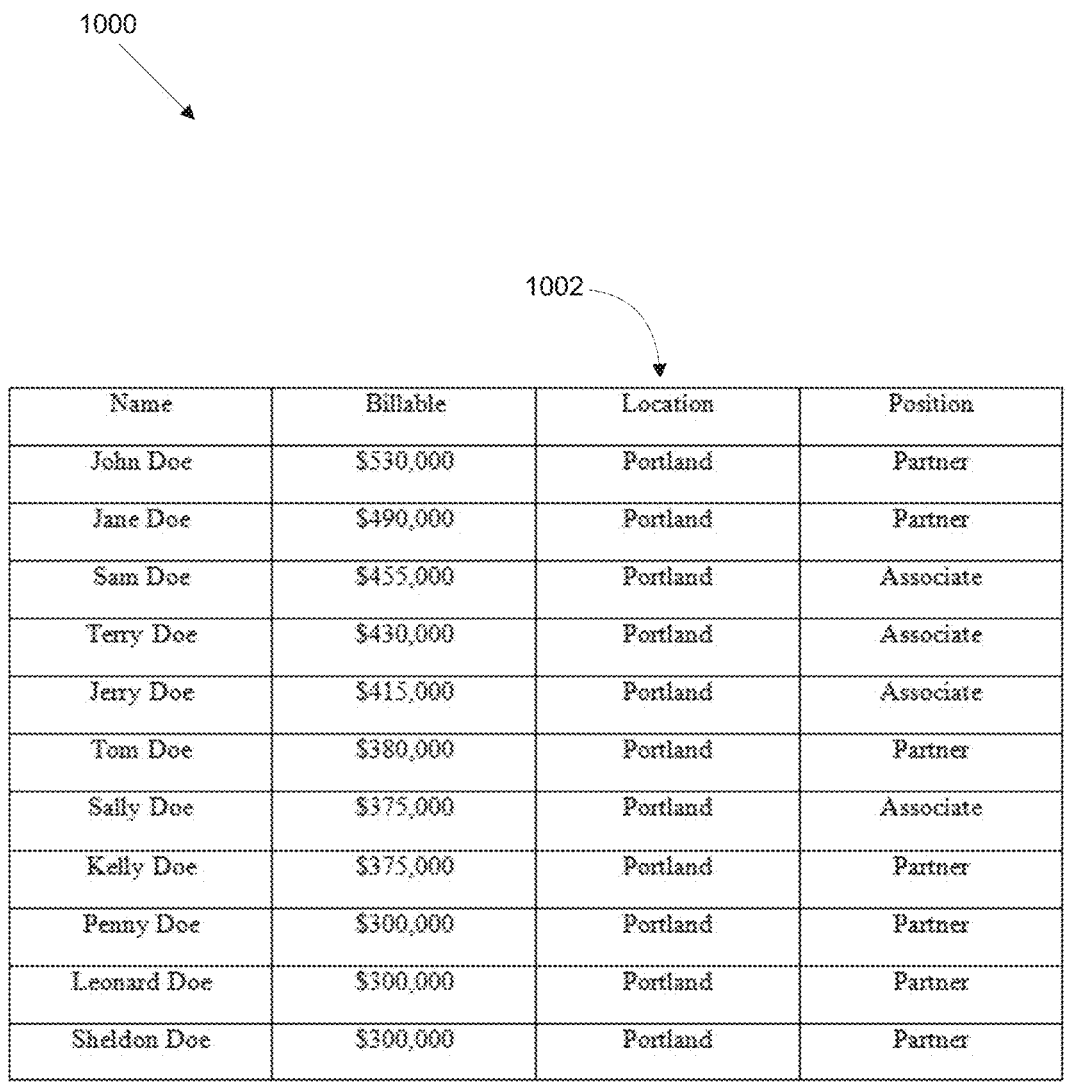
FIG. 10 shows an example filtered data agnostic data set of the data agnostic data set of FIG. 8 according to some implementations.

FIG. 10 shows an example filtered data agnostic data set 1000 of the data agnostic data set 800 of FIG. 8 according to some implementations. The filtered data agnostic data set 1000 may have been produced by the data format layer 212 (FIG. 2) in response to a filtering operation being applied to the data agnostic data set 800. The data format layer 212 may produce the filtered data agnostic data set 1000 in accordance with the update of the data agnostic data set 218 (FIG. 2), as described in relation to FIG. 2.

The filtering operation may include filtering the data agnostic data set 800 based on the characteristic of the entry in the 'location' field 1002 being equal to 'Portland'. The characteristic for the filtering operation may be determined by the runtime environment 210 (FIG. 2) based on a user interaction with the user interface layout 900 (FIG. 9). In particular, the user interaction may have been with the first portion 910 (FIG. 9) of the second data presentation 904 (FIG. 9) associated with 'Portland', a checkbox associated with 'Portland', or some combination thereof. The user interaction may indicate a request to filter one of the first data presentation 902 (FIG. 9) or the second data presentation 904 based on the characteristic. For example, runtime environment 210 may determine that the user interaction indicates a request to filter the second data presentation 904 based on the user interaction having been with the first portion 910 of the second data presentation 904. The runtime environment 210 may) detect the request to filter the based on the characteristic from the user interaction. Based on detection of the request to filter, the runtime environment 210 may transmit an indication of the request to filter the data of the data agnostic data set 800 based on the characteristic to the database system 202 (FIG. 2).

The database system 202 may identify data within the data sets 300 (FIG. 3) associated with the request to filter and may filter the data based on the request to filter to produce filtered data. Further, the database system 202 may identify one or more links (such as the links 402 (FIG. 4) and/or the links 502 (FIG. 5)) associated with the filtered data. The database system 202 may identify the links by identifying metadata associated with each of the entries of the filtered data and determining if the metadata includes the links.

Based on identifying the links, the database system 202 may identify additional data to which the links are directed (referred to as "the linked data"). The database system 202 may transmit the filtered data and the linked data to the runtime environment 210 to produce the filtered data agnostic data set 1000. In some instances, the database system 202 may not identify links associated with the filter data and may transmit only the filtered data to the runtime environment 210 to produce the filtered data agnostic data set 1000. Further, in some examples, the database system 202 may determine that the filtered data is the same as a portion of the data previously provided to the runtime environment 210 and may transmit an indication of the filtered data rather than the filtered data.

The runtime environment 210 may receive filtered data and/or the linked data from the database system 202. In response to receiving the filtered data and/or the linked data, the data format layer 212 may generate the filtered data agnostic data set 1000. In the illustrated example, the filtered data and/or the linked data may have included data associated with 'Portland' as the entry value of the 'location' field 1002. Accordingly, the data format layer 212 generates the filtered data agnostic data set 1000 to include the data associated with 'Portland' as the entry value of the 'location' field 1002.

Figure 11:
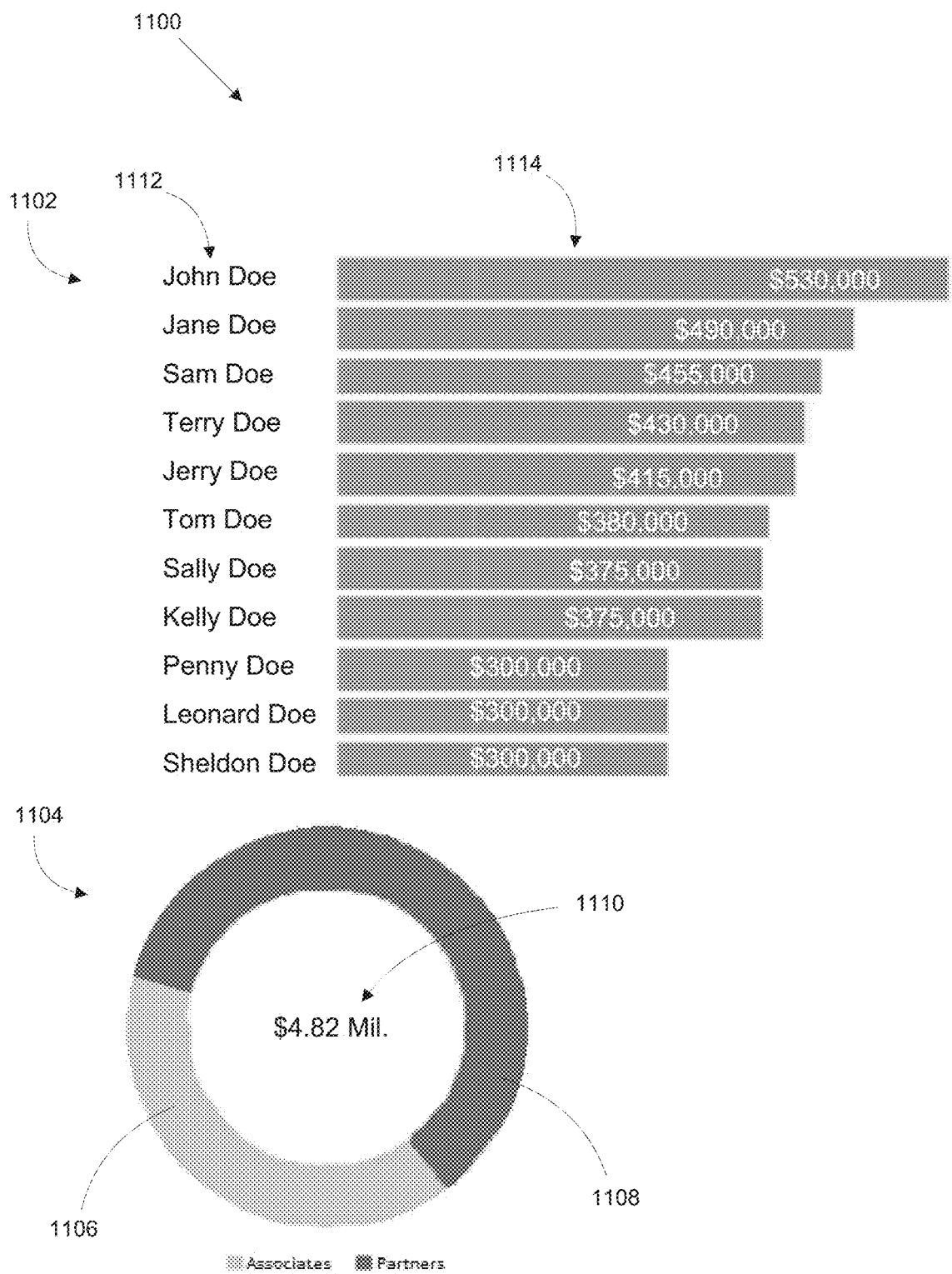
FIG. 11 shows an example updated user interface layout of the user interface layout of FIG. 9 according to some implementations.

FIG. 11 shows example updated user interface layout 1100 of the user interface layout 900 of FIG. 9 according to some implementations. The updated user interface layout 1100 may be updated based on the filtered data agnostic data set 1000 (FIG. 10). The data presentation generation layer 214 (FIG. 2) may obtain the data of the filtered data agnostic data set 1000 from the data format layer 212 (FIG. 2) to update the first data presentation 902 (FIG. 9) and the second data presentation 904 (FIG. 9).

The data presentation generation layer 214 may generate an updated first data presentation 1102 and an updated second data presentation 1104. The updated first data presentation 1102 may be generated by updating the first data presentation 902. Further, the updated second data presentation 1104 may be generated by updating the second data presentation 904.

The data presentation generation layer 214 may utilize the filtered data provided by the database system 202 (described in relation to FIG. 10) to generate the updated second data presentation 1104. The filtered data utilized to generate the updated second data presentation 1104 may be a subset of the data utilized to generate the second data presentation 904. In the illustrated example, the filtered data utilized to generate the updated second data presentation 1104 may include the data entry values from the 'billable' field associated with data entry value of 'Portland' within the 'location' field of data agnostic data set 800, which is a subset of the data entry values from the 'billable' field associated with all three data entry values of the 'location' field of the data agnostic data set 800 utilized to generate the second data presentation 904.

The illustrated updated second data presentation 1104 may include the version of the pie chart. The version of the pie chart may include a first portion 1106 associated with the data entry value of 'Associate' within the 'position' field of the filtered data agnostic data set 1000 and a second portion 1106 associated with the data entry value of 'Partner' within the 'position' field of the filtered data agnostic data set 1000. The data presentation generation layer 214 may size the first portion 1106 based on an aggregate value of the data entry values from the 'billable' field associated with the data entry value of 'Associate', and may size the second portion 912 based on an aggregate value of the data entry values from the 'billable' field associated with the data entry value of 'Partner'. Further, the updated second data presentation 1104 may include an aggregate value 1110 of all the data entry values from the 'billable' field of the data agnostic data set 1000 displayed in a center of the pie chart.

The data presentation generation layer 214 may utilize the filtered data and/or the linked data provided by the database system 202 (described in relation to FIG. 10) to generate the updated first data presentation 1102. The updated first data presentation 1102 may include a bar graph representation of data within the filtered data agnostic data set 1000. In the illustrated example, the first data presentation 1102 may be a bar graph illustrating the relationship between the data entry values from the 'name' field and the data entry values from the 'billable' field of the filtered data agnostic data set 1000. The first data presentation 1102 may list names 1112 from the data entry values of the 'name' field of the filtered data agnostic data set 1000 and illustrate the billables 1114 from the data entry values of the 'billable' field of the filtered data agnostic data set 1000 as bars of the bar graph next to the corresponding name.

Figure 12:
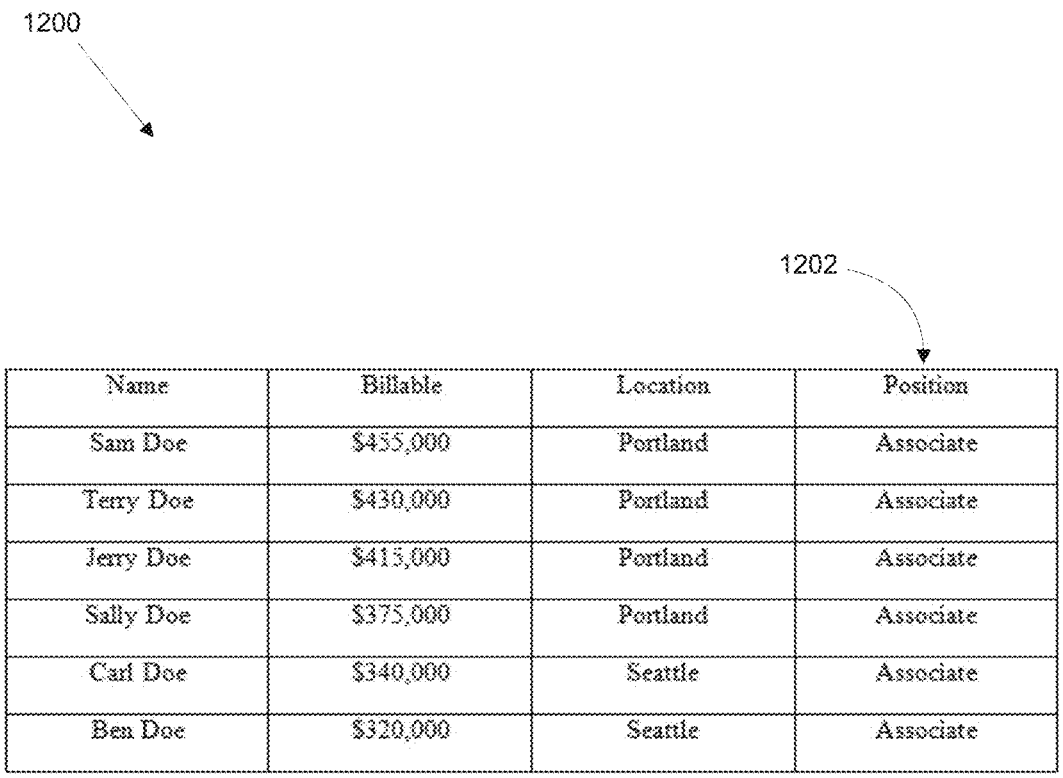
FIG. 12 shows another example filtered data agnostic data set of the data agnostic data set of FIG. 8 according to some implementations.

FIG. 12 shows another example filtered data agnostic data set 1200 of the data agnostic data set 800) of FIG. 8 according to some implementations. The filtered data agnostic data set 1200 may have been produced by the data format layer 212 (FIG. 2) in response to a filtering operation being applied to the data agnostic data set 800. The data format layer 212 may produce the filtered data agnostic data set 1200 in accordance with the update of the data agnostic data set 218 (FIG. 2), as described in relation to FIG. 2.

The filtering operation may include filtering the data agnostic data set 800 based on the characteristic of the entry in the 'position' field 1202 being equal to 'Associate'. The characteristic for the filtering operation may be determined by the runtime environment 210 (FIG. 2) based on a user interaction with the user interface layout 900 (FIG. 9). In particular, the user interaction may have been with one of the names 906 associated with 'Associate', a checkbox associated with 'Associate', or some combination thereof. The user interaction may indicate a request to filter one of the first data presentation 902 (FIG. 9) or the second data presentation 904 based on the characteristic. For example, runtime environment 210 may determine that the user interaction indicates a request to filter the first data presentation 902 based on the user interaction having been with the one of the names 906 of the first data presentation 902. The runtime environment 210 may detect the request to filter the based on the characteristic from the user interaction. Based on detection of the request to filter, the runtime environment 210 may transmit an indication of the request to filter the data of the data agnostic data set 800 based on the characteristic to the database system 202 (FIG. 2).

The database system 202 may identify data within the data sets 300 (FIG. 3) associated with the request to filter and may filter the data based on the request to filter to produce filtered data. Further, the database system 202 may identify one or more links (such as the links 402 (FIG. 4) and/or the links 502 (FIG. 5)) associated with the filtered data. The database system 202 may identify the links by identifying metadata associated with each of the entries of the filtered data and determining if the metadata includes the links.

Based on identifying the links, the database system 202 may identify additional data to which the links are directed (referred to as "the linked data"). The database system 202 may transmit the filtered data and the linked data to the runtime environment 210 to produce the filtered data agnostic data set 1200. In some instances, the database system 202 may not identify links associated with the filter data and may transmit only the filtered data to the runtime environment 210 to produce the filtered data agnostic data set 1200. Further, in some examples, the database system 202 may determine that the filtered data is the same as a portion of the data previously provided to the runtime environment 210 and may transmit an indication of the filtered data rather than the filtered data.

The runtime environment 210 may receive filtered data and/or the linked data from the database system 202. In response to receiving the filtered data and/or the linked data, the data format layer 212 may generate the filtered data agnostic data set 1200. In the illustrated example, the filtered data and/or the linked data may have included data associated with 'Associate' as the data entry value of the 'position' field 1202. Accordingly, the data format layer 212 generates the filtered data agnostic data set 1200 to include the data associated with 'Associate' as the entry value to the 'position' field 1202.

Figure 13:
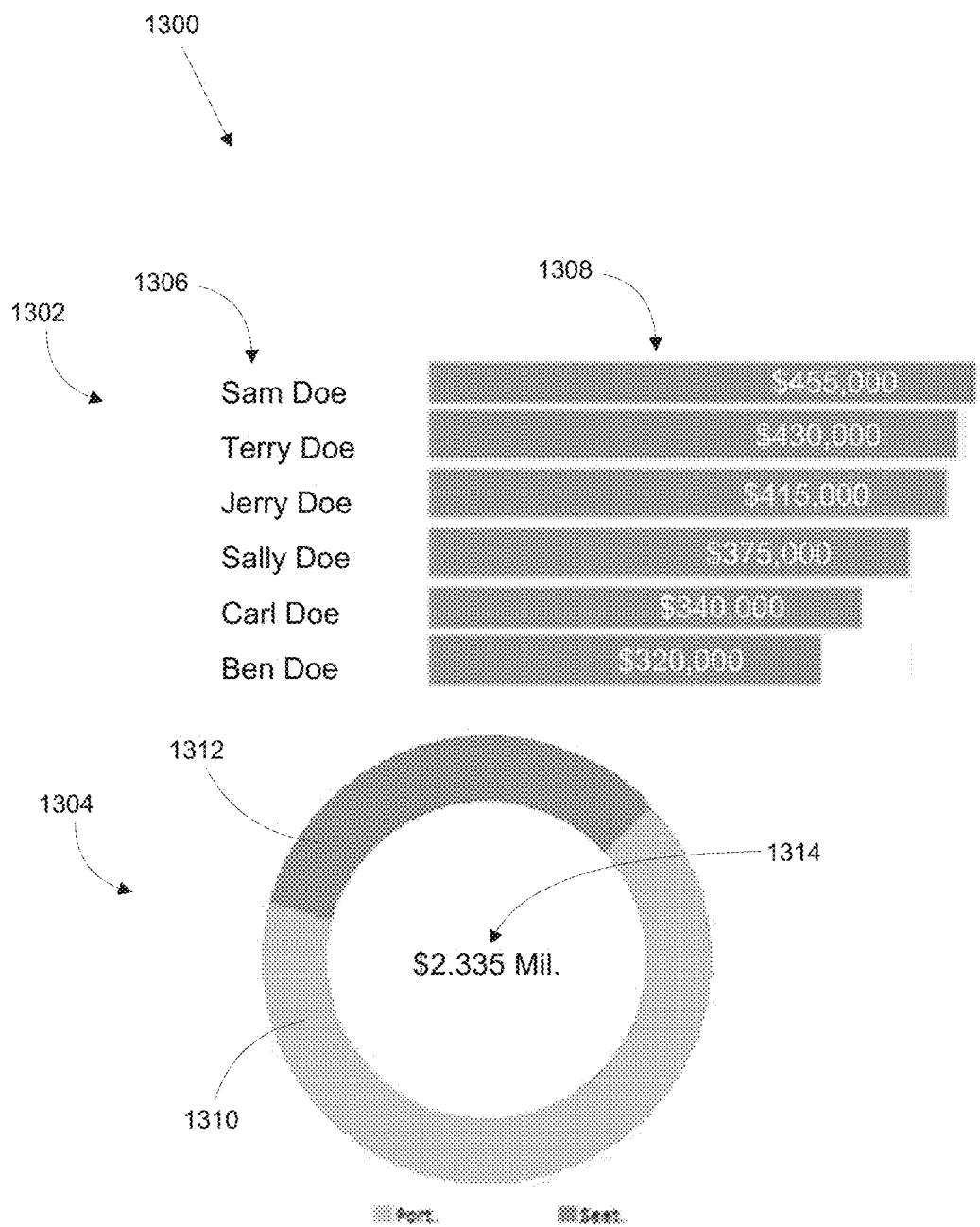
FIG. 13 shows another example updated user interface layout of the user interface layout of FIG. 9 according to some implementations.

FIG. 13 shows another example updated user interface layout 1300 of the user interface layout 900 of FIG. 9 according to some implementations. The updated user interface layout 1300 may be updated based on the filtered data agnostic data set 1200 (FIG. 12). The data presentation generation layer 214 (FIG. 2) may obtain the data of the filtered data agnostic data set 1200 from the data format layer 212 (FIG. 2) to update the first data presentation 902 (FIG. 9) and the second data presentation 904 (FIG. 9).

The data presentation generation layer 214 may generate an updated first data presentation 1302 and an updated second data presentation 1304. The updated first data presentation 1302 may be generated by updating the first data presentation 902. Further, the updated second data presentation 1304 may be generated by updating the second data presentation 902.

The data presentation generation layer 214 may utilize the filtered data provided by the database system 202 (described in relation to FIG. 10) to generate the updated first data presentation 1302. The filtered data utilized to generate the updated first data presentation 1302 may be a subset of the data utilized to generate the first data presentation 902. In the illustrated example, the filtered data utilized to generate the updated first data presentation 1302 may include the data entries from the 'billable' field and the name 'field' associated with data entry value of 'Associate' within the 'position' field of data agnostic data set 800, which is a subset of the data entry entries from the 'billable' field associated with both the 'Associate' and the 'Partner' data entry values of the 'position' field of the data agnostic data set 800 utilized to generate the first data presentation 902.

The illustrated updated first data presentation 1302 may include the bar graph representation of data from the filtered data agnostic data set 1200. In the illustrated example, the first data presentation 1102 may be a bar graph illustrating the relationship between the data entry values from the 'name' field and the data entry values from the 'billable' field of the filtered data agnostic data set 1200. The first data presentation may list names 1302 from the data entry values of the 'name' field of the filtered data agnostic data set 1200 and illustrate billable 1308 from the data entry values of the 'billable' field of the filtered data agnostic data set 1200 as bars of the bar graph next to the corresponding name.

The data presentation generation layer 214 may utilize the filtered data and/or the linked data provided by the database system 202 (described in relation to FIG. 10) to generate the updated second data presentation 1304. The updated second data presentation 1304 may include the version of the pie chart. The version of the pie chart may include a first portion 1310 associated with the data entry value of 'Portland' within the 'location' field of the data agnostic data set 1200 and a second portion 1312 associated with the data entry value of 'Seattle' within the 'location' field of the filtered data agnostic data set 1200. The data presentation generation layer 214 may size the first portion 1310 based on an aggregate value of the data entry values from the 'billable' field associated with the data entry value of 'Portland', and may size the second portion 1312 based on an aggregate value of the data entry values from the 'billable' field associated with the data entry value of 'Seattle'. Further, the updated second data presentation 1304 may include an aggregate value 1314 of all the data entry values from the 'billable' field of the filtered data agnostic data set 1200 displayed in a center of the pie chart.

Figure 14:
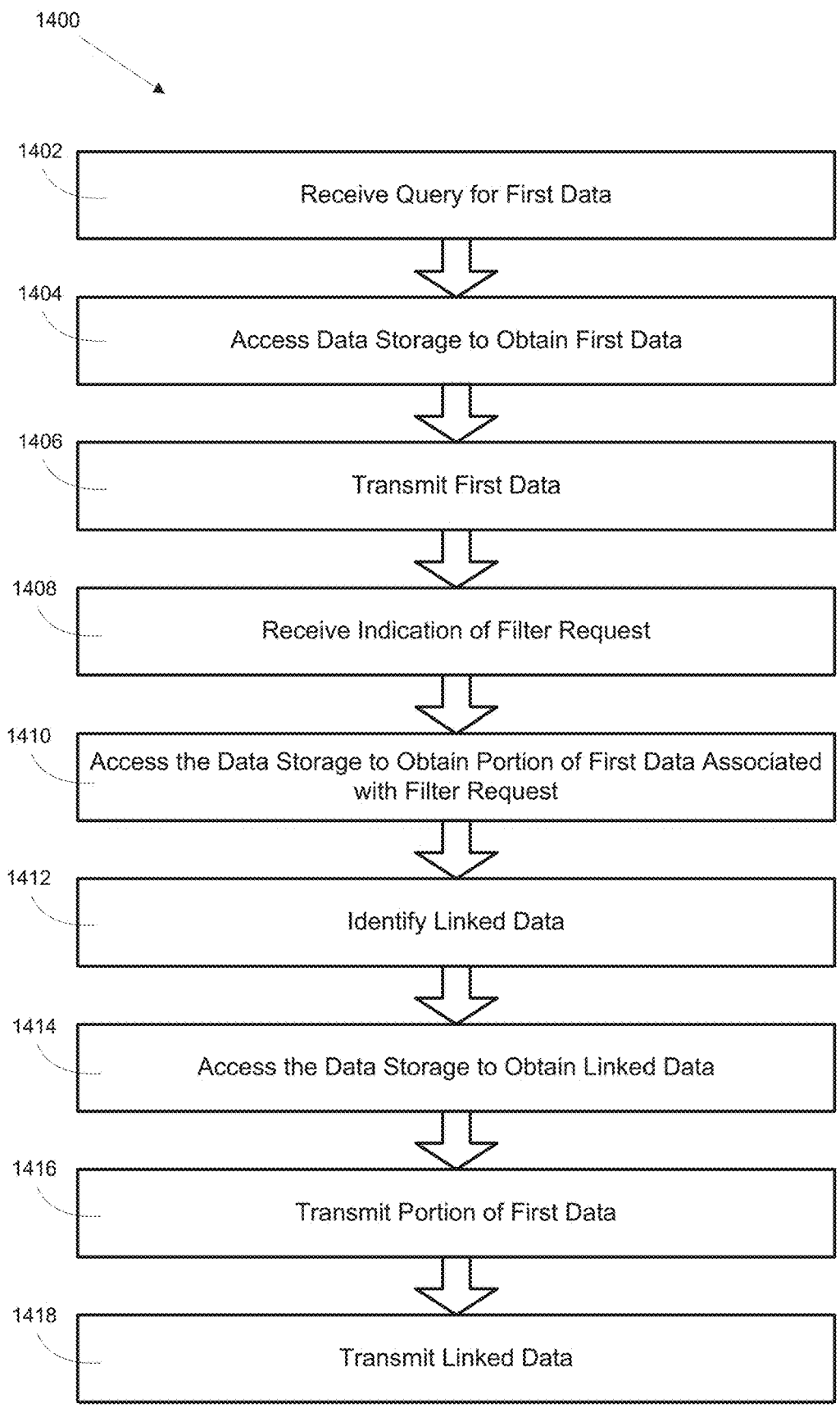
FIG. 14 shows an example data filter procedure according to some implementations.

FIG. 14 shows an example data filter procedure 1400 according to some implementations. The data filter procedure 1400 may be performed by the database system 202 (FIG. 2).

In stage 1402, the database system 202 may receive a query for first data from the user system 204 (FIG. 2). The first data may include data for generating a user interface layout by the runtime environment 210. The query for the first data may include an indication of one or more characteristics associated with the first data.

In stage 1404, the database system 202 may access the data storage 208 (FIG. 2) to obtain the first data. The first data may be obtained from one or more of the data sets 206 (FIG. 2). The database system 202 may identify the first data within the data sets 206 based on the one or more characteristics and obtain the identified first data from the data sets 206.

In stage 1406, the database system 202 may transmit the first data to the user system 204.

In stage 1408, the database system 202 may receive an indication of a filter request. The filter request may include one or more of the features of the filter requests described throughout this disclosure. The indication of the filter request may include an indication of one or more characteristics for which the first data is to filtered, an indication of the first data, or some combination thereof.

In stage 1410, the database system 202 may access the data storage 208 to obtain the portion of the first data associated with the filter request. The portion of the first data may be produced by filtering of the first data based on the filter request. The database system 202 may access the first data and identify a portion of the first data that is to be returned to the user system 204 based on the one or more characteristics received in the indication of the first request. Identifying the portion of the first data may include identifying a portion of the data entries within the data sets 206 associated with the characteristics, metadata associated with a portion of the data entries within the data sets 206 that is associated with the characteristics, or some combination thereof.

In stage 1412, the database system 202 may identify linked data. The database system 202 may analyze metadata associated with the identified portion of the first data to determine whether the metadata includes any links (such as the links 402 (FIG. 4) and/or the links 502 (FIG. 5)). If the metadata includes links, the database system 202 may identify a portion of the data within the data sets 206 to which the links are directed and determine that the portion of the data is the linked data.

In stage 1414, the database system 202 may access the data storage 208 to obtain the linked data. The database system 202 may obtain the linked data from one or more of the data sets 206. In some examples, the linked data may be located in a different one of the data sets 206 from the first data. For example, the first data may be located within the first data set 206a (FIG. 2) and the second data may be located within the second data set 206b (FIG. 2).

In stage 1416, the database system 202 may transmit the portion of the first data to the user system 204. The runtime environment 210 may update a data presentation displayed within a user interface layout to display the portion of the first data. The runtime environment 210 may update the data presentation in response to receiving the portion of the first data.

In stage 1418, the database system 202 may transmit the linked data to the user system 204. The runtime environment 210 may update another data presentation displayed within the user interface layout to display the linked data. The runtime environment 210 may update the data presentation in response to receiving the linked data.

Figure 15:
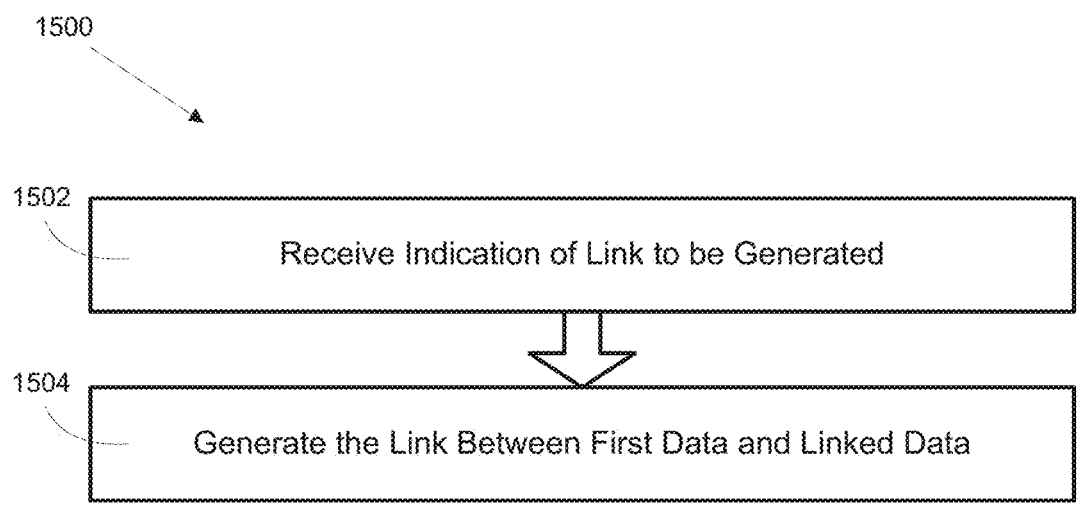
FIG. 15 shows an example link generation procedure according to some implementations.

FIG. 15 shows an example link generation procedure 1500 according to some implementations. The link generation procedure 1500 may be performed by the database system 202 (FIG. 2). Further, the link generation procedure 1500 may result in the generation of one or more links, such as the links 402 (FIG. 4) and/or the links 502 (FIG. 5).

In stage 1502, the database system 202 may receive an indication of a link to be generated between two different portions of data within the one or more of the data sets 206 (FIG. 2). The database system 202 may receive the indication from a user system 204 (FIG. 2). The two different portions of data may have been previously transmitted to the user system 204 for display on the user system 204. In some examples, the two different portions of data may have been previously transmitted to the user system 204 with additional data not included in the indication of the link to be generated.

In stage 1504, the database system 202 may generate a link between the two different portions of data. The link may include the features of the links 402, the links 502, or some combination thereof. Generating the link may include generating metadata to be associated with the first portion of the data and the second portion of the data. The metadata may include an indication of a characteristic associated with the link, the first portion of the data, the second portion of the data, or some combination thereof. The database system may associate the metadata with the first portion of the data and/or the second portion of the data.

Figure 16:
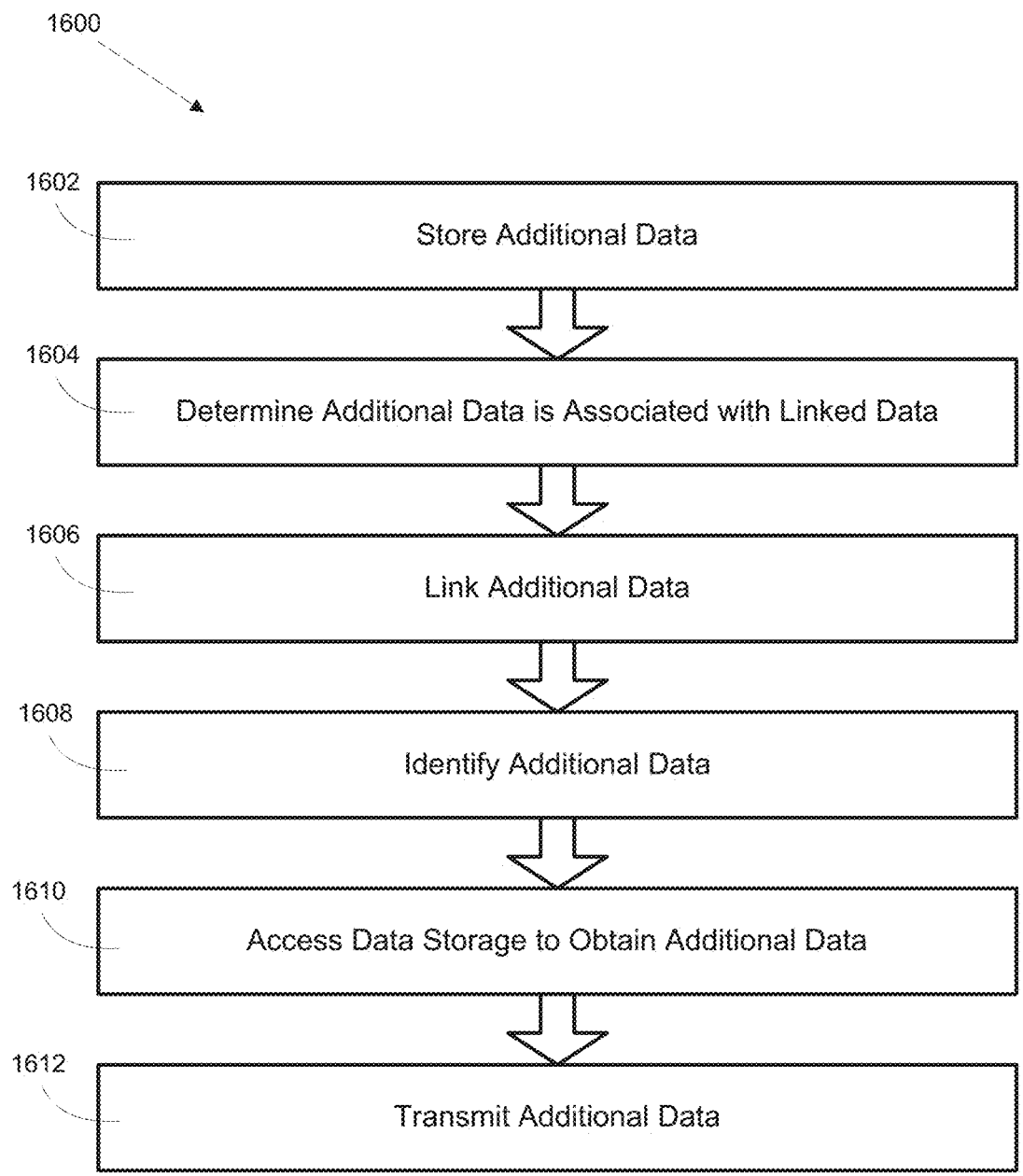
FIG. 16 shows an example additional data storage procedure according to some implementations.

FIG. 16 shows an example additional data storage procedure 1600 according to some implementations. The additional data storage procedure 1600 may be performed by the database system 202 (FIG. 2). In particular, the database system 202 may store additional data to the data sets 206 (FIG. 2), wherein the data included the data sets 206 may include one or more links, such as the links 402 (FIG. 4), the links 502 (FIG. 5), or some combination thereof.

In stage 1602, the database system 202 may store the additional data. The database system 202 may store the additional data in the data storage 208 (FIG. 2). The database system 202 may store the additional data within one or more of the data sets 206 stored on the data storage 208, generate one or more additional data sets including the additional data to be stored on the data storage 208 with the data sets 206, or some combination thereof.

In stage 1604, the database system 202 may determine whether the additional data is associated with linked data. Determining whether the additional data is associated with linked data may include identifying data already stored within the data sets 206 that is related to the additional data, includes the same characteristics as the additional data, is in a same field as the additional data, or some combination thereof. The database system 202 may analyze the identified data to determine whether metadata is associated with the identified data and whether the metadata includes one or more links. In response to determining that the identified data is associated with one or more links, the procedure 1600 may proceed to stage 1606. Whereas, in response to determining that the identified data is not associated with one or more links, the procedure 1600 may terminate (i.e. not perform stages 1606-1612).

In stage 1606, the database system 202 may link the additional data. Linking the additional data may include copying the links associated with the identified data and associating the links with the additional data. The database system 202 may generate metadata for the additional data that includes the links and associate the metadata with the additional data. The procedure 1600 may terminate after stage 1606 if none of the data within the data storage 208 had been previously transmitted to a user system, such as the user system 204 (FIG. 2). If data from the data storage 208 had been previously transmitted to a user system, the procedure 1600 may proceed to stage 1608.

In stage 1608, the database system 202 may determine whether the additional data is linked to data that had been previously transmitted to the user system. If the additional data is linked to the data that had been previously transmitted to the user system, the procedure 1600 may proceed to stage 1608.

In some examples, the database system 202 may determine whether the additional data is associated with a filter request received by the database system 202. The database system 202 may identify that the additional data is associated with the filter request based on a characteristic included with an indication of the filter request. Further, the database system 202 may determine that the additional data is linked to filtered data associated with the filter request based on links associated with the filtered data, the additional data, or some combination thereof. The database system 202 may determine that the additional data is to be transmitted, along with the filtered data, to a user system (such as user system 204) that generated the filter request responsive to the filter request.

In stage 1610, the database system 202 may access the data storage 208 to obtain the additional data.

In stage 1612, the database system 202 may transmit the additional data to the user system. In examples where the database system 202 determines that the additional data is associated with a filter request, the database system 202 may transmit the additional data to the user system in response to the filter request. In examples where the database system 202 determines that the additional data is associated with data that had been previously transmitted to the user system, the database system 202 may transmit the additional data in response to the determination, at predetermined time intervals, in response to an indication of an update trigger received from the user system, or some combination thereof.

Figure 17:
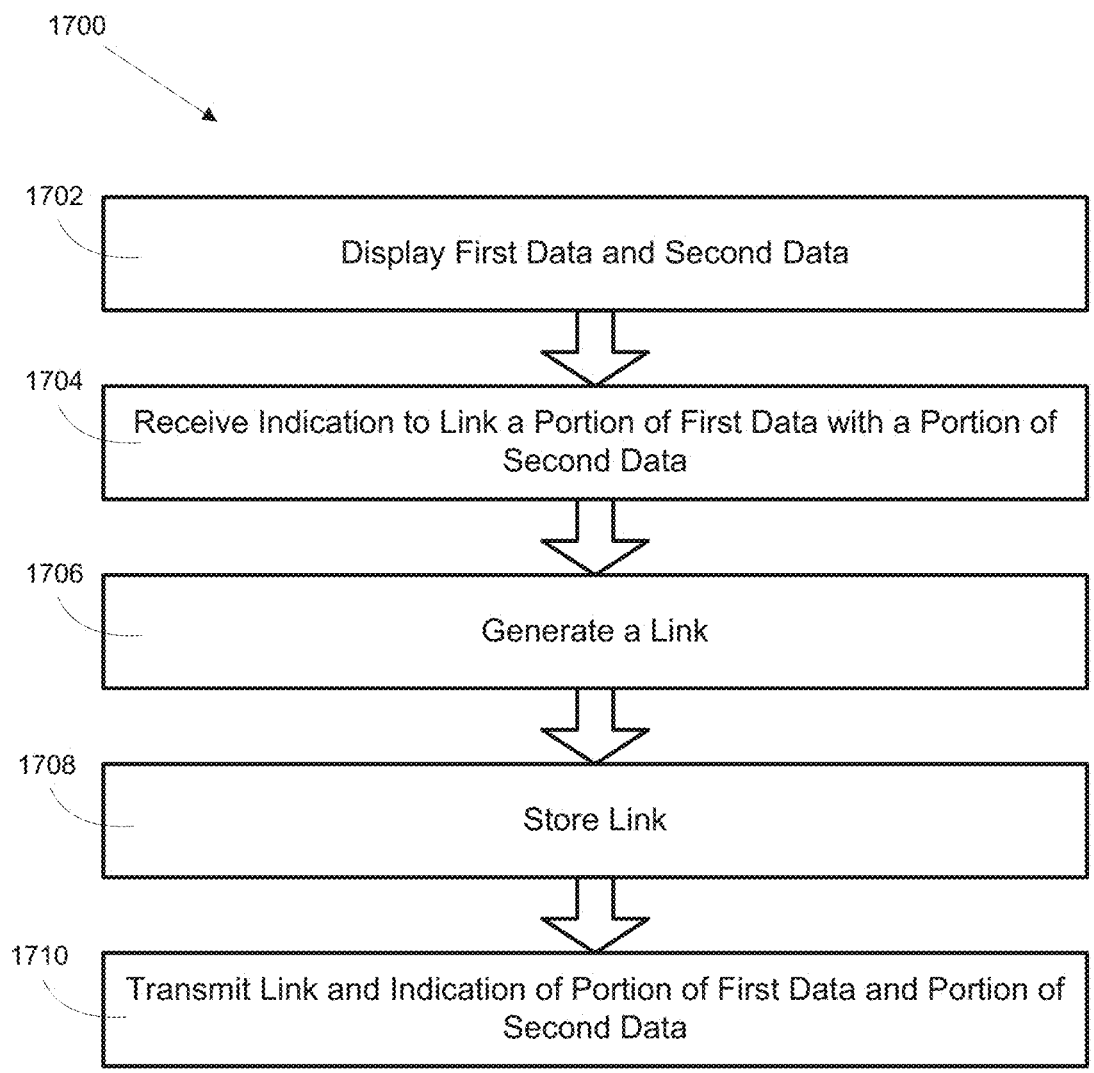
FIG. 17 shows an example data link procedure according to some implementations.

FIG. 17 shows an example data link procedure 1700 according to some implementations. The procedure 1700 may be performed by the user system 204. In particular, the runtime environment 210 may be operating in the developer mode (as described in relation to FIG. 4) on the user system 204 when procedure 1700 is performed.

In stage 1702, the user system 204 may display first data and second data on a user interface of the user system 204. The first data may be from a first data set and the second data may be from a second data set.

In stage 1704, the user system 204 may receive and/or identify an indication to link a portion of the first data to a portion of the second data. The indication may be received via the user interface of the user system 204. Further, the indication may include a characteristic and indicate that the portion of the first data and the portion of the second data are to be linked based on the characteristic.

In stage 1706, the user system 204 may generate a link between the portion of the first data and the portion of the second data. The link may indicate that the portion of the first data and the portion of the second data are linked based on the characteristic. The link may include one or more of the features of the links 402 (FIG. 4) and/or the links 502 (FIG. 5). The link may include metadata to be associated with the portion of the first data and the portion of the second data. The metadata may include an indication of the characteristic.

In stage 1708, the user system 204 may store the link. The user system 204 may store the link within a memory system (such as the memory system 12B (FIG. 1B)) of the user system 204. Storing the link may include associating the link with the portion of the first data and the portion of the second data, storing the link with the portion of the first data and the portion of the second data, or some combination thereof.

In stage 1710, the user system 204 may transmit the link and an indication of the first data and the portion of the second data to a database system, such as the database system 202 (FIG. 2). In some examples, the transmission may include a request for the database system 202 to generate the link between the portion of the first data and the portion of the second data. In response to receiving the transmission, the database system 202 may perform procedure 1500 (FIG. 15).

Figure 18:
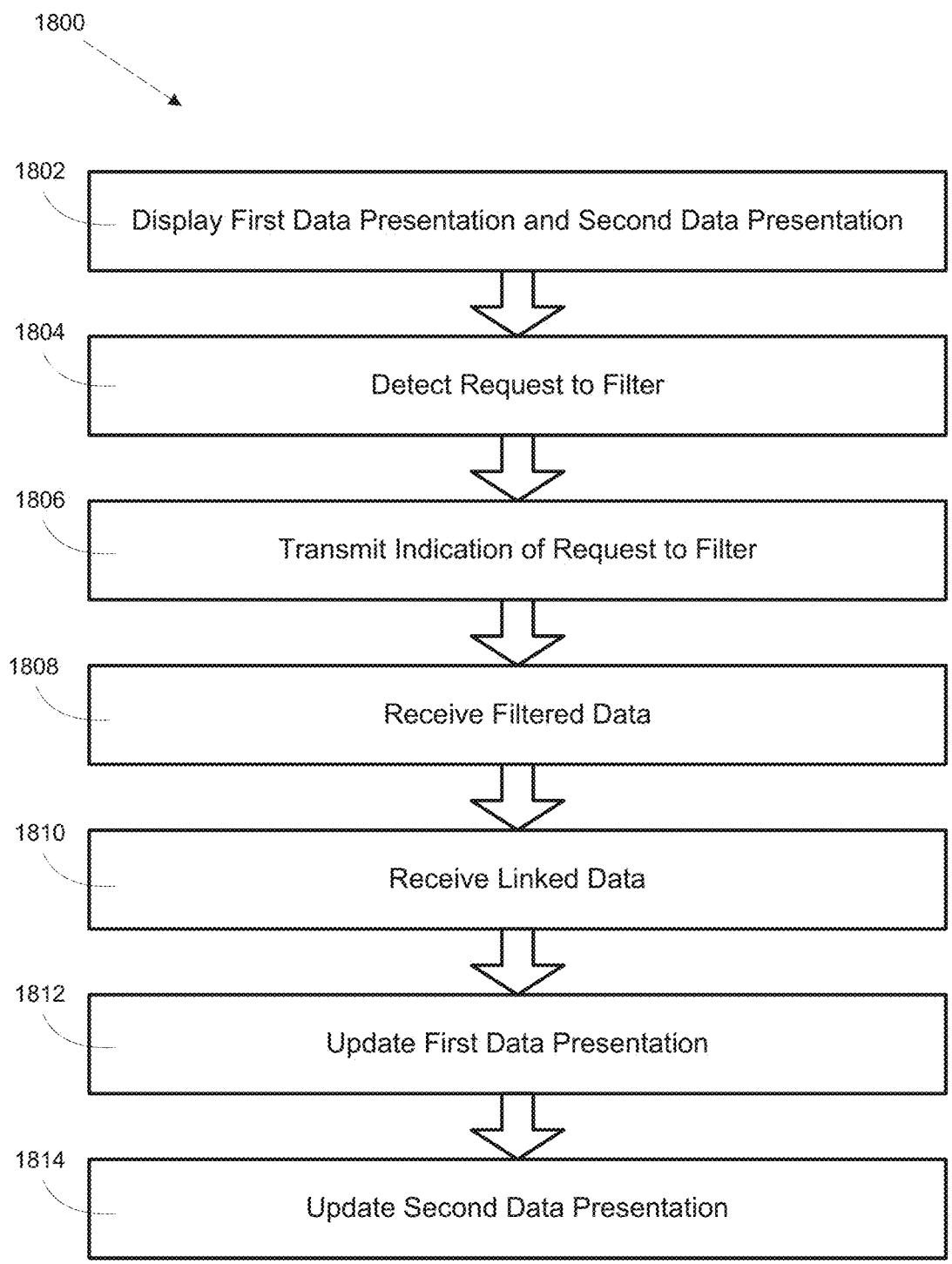
FIG. 18 shows an example data presentation update procedure according to some implementations.

FIG. 18 shows an example data presentation update procedure 1800 according to some implementations. The procedure 1800 may be performed by the user system 204 (FIG. 2). In particular, one or more stages of the procedure 1800 may be performed by the runtime environment 210 (FIG. 2) operating on the user system 204.

In stage 1802, the user system 204 may display a first data presentation and a second data presentation on a user interface of the user system 204. The first data presentation and the second data presentation may include one or more of the features of the data presentations described throughout this disclosure. The first data presentation and the second data presentation may be displayed within a user interface layout, such as the first user interface layout 228 (FIG. 2) and/or the second user interface layout 230 (FIG. 2). In some examples, the first data presentation may present first data from a first data set and the second data presentation may present second data from a second data set. For example, the first data presentation may present first data from the first data set 206*a* (FIG. 2) and the second data presentation may present second data from the second data set 206*b* (FIG. 2).

In stage 1804, the user system 204 may detect a request to filter. The user system 204 may detect the request to filter in accordance with any of the described detections of a request to filter described throughout this disclosure. In some examples, the user system 204 may detect a user interaction with a user interface of the user system 204 and determine that the user interaction indicates a request to filter. The request to filter may include a request to filter first data presented within the first data presentation. The request to filter may further include an indication of a characteristic, wherein the request to filter is to filter the first data based on the characteristic.

In stage 1806, the user system 204 may transmit an indication of the request to filter to a database system, such as the database system 202 (FIG. 2). The indication of the request to filter may include an indication of the first data, an indication of the characteristic, or some combination thereof.

In stage 1808, the user system 204 may receive filtered data from the database system 204. The filtered data may include data produced by performing a filtering operation on the first data. The filtering operation may include any means of producing filtered data described throughout this disclosure. The filtered data may include a portion of the first data that was requested to be filtered.

In stage 1810, the user system 204 may receive linked data. The linked data may include data linked to the filtered data by links, such as the links 402 (FIG. 4) and/or the links 502 (FIG. 5). The linked data may be included in the second data.

In stage 1812, the user system 204 may update the first data presentation. The user system 204 may update the first data presentation to display the filtered data. The user system 204 may utilize the filtered data received from the database system to update the first data presentation. The user system 204 may update the first data presentation in response to receiving the filtered data.

In stage 1814, the user system 204 may update the second data presentation. The user system 204 may update the second data presentation to display the linked data. The user system 204 may utilize the linked data received from the database system to update the second data presentation. The user system 204 may update the second data presentation in response to receiving the linked data.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system, comprising:
a data storage configurable to store one or more data sets;
a processor coupled to the data storage; and
one or more stored sequences of instructions which, when executed by the processor, are operable to cause the processor to:

receive, from a user system, an indication of a link to be generated between a portion of first data and linked data;

generate the link between the portion of the first data and the linked data, the link is included in one or more links;

process a query, received from the user system, for the first data included in the one or more data sets;

access the data storage to obtain the first data based on the query;

transmit, to the user system, the first data;

process an indication, received from the user system, of a filter request to filter the first data based on a characteristic;

identify linked data within second data based on the characteristic, the linked data linked to the portion of the first data associated with the filter request, and to identify the linked data within the second data, the one or more stored sequences of instructions are operable to cause the processor to:
  identify the portion of the first data associated with the filter request, and
  identify one or more links associated with the portion of the first data, the one or more links directed to the linked data;

access the data storage to obtain the linked data;

update a first data presentation based on filtered data received by the user system from the database system; and transmit the linked data to the user system, and update a second data presentation that displayed the second data based on the linked data.

2. The database system of claim 1, wherein the one or more links include metadata associated with the portion of the first data.

3. The database system of claim 1, wherein to generate the link includes to:
  generate metadata to be associated with the portion of the first data and the linked data, the metadata including an indication of the characteristic;
  associate the metadata with the portion of the first data; and
  associate the metadata with the linked data.

4. The database system of claim 1, wherein the one or more stored sequences of instructions, when executed by the processor, further cause the processor to:
  access the data storage to obtain the portion of the first data associated with the filter request in response to reception of the indication of the filter request; and
  transmit the portion of the first data to the user system, to enable updating of a second data presentation that displayed the first data to display the portion of the first data.

5. The database system of claim 1, wherein:
  the first data is located within a first data set of the one or more data sets and the first data set is stored in a first format; and
  the second data is located within a second data set of the one or more data sets and the second data set is stored in a second format, wherein the second format is different from the first format.

6. The database system of claim 1, wherein the one or more stored sequences of instructions, when executed by the processor, further cause the processor to:
  store additional data in the one or more data sets;
  determine that the additional data is associated with the linked data; and
  link the additional data to the portion of the first data based on the determination that the additional data is associated with the linked data.

7. The database system of claim 6, wherein the one or more stored sequences of instructions, when executed by the processor, further cause the processor to:
  identify the additional data based on the characteristic, the additional data linked to the portion of the first data associated with the filter request;
  access the data storage to obtain the additional data; and
  transmit the additional data to the user system, enable updating of the data presentation that displayed the second data to display the linked data and the additional data.

8. The database system of claim 1, wherein the filtered data includes the portion of the first data and/or the linked data.

9. A user system, comprising:
  a user interface;
  a processor; and
  one or more stored sequences of instructions which, when executed by the processor, are operable to cause the processor to:
    display first data of a first data set and second data of a second data set via the user interface;
    process an indication, received via the user interface, that a portion of the first data is to be linked with a portion of the second data based on a characteristic;
    generate a link between the portion of the first data and the portion of the second data, the link to indicate that the portion of the first data and the portion of the second data are linked based on the characteristic;
    store the link, the link configured to be accessed for filter operations associated with the first data and the second data, the filter operations providing filtered data to update a first data presentation and the link associated with linked data to update a second data presentation, the linked data is identified by: identification of the portion of the first data based on the characteristic, and identification of one or more links associated with the portion of the first data, the one or more links directed to the linked data; and
    transmit, to a database system, the link and an indication of the portion of the first data and the portion of the second data to enable the database system to associate the link with the portion of the first data and the portion of the second data stored on a data storage of the database system.

10. The user system of claim 9, wherein the link includes metadata to be associated with the portion of the first data and the portion of the second data.

11. The user system of claim 9, wherein the first data set is stored in a first format and the second data set is stored in a second format, wherein the second format is different from the first format.

12. The user system of claim 9, wherein the filtered data includes the portion of the first data and/or the linked data.

13. A user system, comprising:
  a user interface;
  a processor; and
  one or more stored sequences of instructions which, when executed by the processor, are operable to cause the processor to:
    display a first data presentation and a second data presentation via the user interface, the first data presentation to present first data from a first data set and the second data presentation to present second data from a second data set;

send, to a database system, an indication of a link to be generated between a portion of the first data and linked data;

receive, from the database system, the generated link between the first data and the linked data, the link is included in one or more links;

detect a request to filter the first data based on a characteristic, the request to be received via the user interface;

transmit an indication of the request to filter to the database system, the indication of the request to filter includes an indication of the characteristic;

receive from a database system linked data of the second data based on the characteristic, the linked data linked to a portion of the first data associated with the filter request, wherein the linked data of the second data is identified by: identifying the portion of the first data associated with the filter request, and identifying one or more links associated with the portion of the first data, the one or more links directed to the linked data;

process linked data of the second data, received from the database system, the linked data linked with a portion of the first data based on the characteristic;

update the first data presentation to display filtered first data received by the user system from the database system, the first data to be filtered based on the characteristic to produce the filtered first data; and update the second data presentation based on the linked data.

14. The user system of claim 13, wherein the first data set is stored in a first format and the second data set is stored in a second format, wherein the second format is different than the first format.

15. The user system of claim 13, wherein to detect the request to filter the first data includes to:
detect a user interaction with the first data presentation, the request indicated via the user interaction; and
determine the characteristic based on the user interaction.

16. The user system of claim 13, wherein to update the first data presentation to display the filtered first data includes to:
update the first data presentation to indicate the filtered first data within the first data via the filtered first data being presented differently from a different portion of the first data.

17. The user system of claim 16, wherein the filtered first data is presented in a first color and the different portion of the first data is presented in a second color in the updated first data presentation, the first color and the second color being different.

18. The user system of claim 13, wherein the linked data received from the database includes an indication of a label associated with a portion of the linked data.

19. The user system of claim 13, wherein the filtered data includes the portion of the first data and/or the linked data.

* * * * *